(12) United States Patent
Holzmann et al.

(10) Patent No.: US 6,353,896 B1
(45) Date of Patent: Mar. 5, 2002

(54) METHOD AND APPARATUS FOR TESTING EVENT DRIVEN SOFTWARE

(75) Inventors: Gerard Johan Holzmann, Murray Hill; Kenneth Lane Thompson; Philip Steven Winterbottom, both of Watchung, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/211,967

(22) Filed: Dec. 15, 1998

(51) Int. Cl.$^7$ .............................. G06F 11/36; G06F 9/44
(52) U.S. Cl. .............................................. 714/38; 717/1
(58) Field of Search ............................. 714/25, 38, 32, 714/33; 717/1, 4, 5; 709/302; 703/13, 16, 17

(56) References Cited

U.S. PATENT DOCUMENTS

| | | | |
|---|---|---|---|
| 5,522,073 A | * | 5/1996 | Courant et al. |
| 5,615,137 A | * | 3/1997 | Holzmann et al. |
| 5,805,892 A | * | 9/1998 | Nakajima |
| 6,158,031 A | * | 12/2000 | Mack et al. |

FOREIGN PATENT DOCUMENTS

EP          0 685 792 A     12/1995   ........... G06F/11/00

OTHER PUBLICATIONS

U.S. Pat. No. 5,572,727, filed on Feb. 6, 1995 and issued on Nov. 5, 1996 to G. H. Larsson, K. M. Odling, K. A. Rosberg and J. H. Karlsson.

U.S. Pat. No. 5,774,725, filed on Jun. 28, 1996 and issued on Jun. 30, 1998 to H. K. Yadav and W. I. Wittel, Jr..

U.S. Pat. No. 5,469,553, filed on Dec. 16, 1994 and issued on Nov. 21, 1995 to P. R. Patrick.

U.S. Pat. No. 5,758,061, filed on Dec. 15, 1995 and issued on May 26, 1998 to T.S. Plum.

U.S. Pat. No. 5,815,716, filed on Oct. 6, 1995 and issued on Sep. 29, 1998 to T. Horiguchi.

U.S. Pat. No. 5,819,276, filed on Oct. 6, 1995 and issued on Oct. 6, 1998 to J. Y. Cai, A. Hassitt, T. Horiguchi, K. M. Ketell and M. Z. Smith.

G. J. Holzmann, "The Model Checker Spin," *IEEE Transactions On Software Engineering*, vol. 23, No. 5, May 1997, pp. 279–295.

B. Beizer, "Techniques for Functional Testing of Software and Systems," Black–Box Testing, John Weiley & Sons, Inc., New York and Canada, 1995.

(List continued on next page.)

*Primary Examiner*—Gopal C. Ray
(74) *Attorney, Agent, or Firm*—Donald P. Dinella

(57) ABSTRACT

A technique for testing event driven software. In accordance with the technique, the source code of the event driven software is directly converted to an automation based model useful in verifying that the program code complies with the desired properties defined by the user. More particularly, the event driven system program code is translated into a target language for a particular model checker. Such a translation results in a model which contains statements directed at whether execution of the program code will affect the behavior of the event driven system. Thus, this model extraction process can be used as input to a logic model checker for determining whether event driven system complies with the desired correctness properties specified by the user. Advantageously, the model extraction process and application of the model checker occurs in a direct and dynamic fashion from the subject event driven system program code without the need for user intervention.

23 Claims, 31 Drawing Sheets

OTHER PUBLICATIONS

C. H. West, "Protocol Validation By Random State Exploration," Protocol Specification, Testing, and Verification, VI, by Sarikaya and G. V. Bochmann (editors), Elsevier Science Publishers, B.V. (North–Holland), 1987, pp. 233–242.

A. T. Schreiner, Using C With Curses, Lex and Yacc: Building a window shell for UNIX system, Prentice Hall, Englewood Cliffs, NJ, 1990.

J. R. Levine et al., Lex & Yacc, O'Reilly & Associates, Inc., Sebastopol, CA, Oct. 1992.

D. Lee et al., Principles And Methods Of Testing Finite State Machines—A Survey, *Proceedings of the IEEE*, vol. 84, pp. 1090–1126, 1996.

S. Chandra et al., "Teapot: Language Support for Writing Memory Coherence Protocol," PLDI'96, 5/96, PA, USA, 1996, pp. 237–248.

\* cited by examiner

FIG. 2

```
  1 //equivalent of state.z in traditional notation
  2 //first switch on current state, then on event
...
 69    default:
 70       print ("no such state %d, line %d\n", x->lineno);
 71       break;
 72
 73    case busy:   //phone is connected to a tone untill hung up
 74       switch(op) {
 75       default:
 76          goto error;
 77
 78       case Crrtone:
 79          x->state = busy
 80          break;
 81
 82       case Cronhook:
 83          send(x, Ctdis, 0);
 84          x->state = idle;
 85          break;
 86       }
 87       break;
...
 89    case conn:          //phones are connected
 90       switch(op) {
 91       default:
 92       case Crconn:     //successful connection
 93          break;        // no state change
 94
 95       case Cronhook:
 96          send(x->term, Ctdis, 0);
 97          send(x, Ctdis, o);
 98          x-.state = idle;
 99          break;
100       }
101       break;

103    case dead;                        //phone unassigned
104       switch(op) {
105       default:                       //check the event
106          print("%l dead and op=%s\n", x, istring(op));
107          break;                      //no state change
108
109       case Crprovlc:                 //line provisioned
110          x->term = 0;                //initialize
111          x->state = idle;            //next state
112          break;
113       }
114       break;
115 ...
                          → TO FIG 2A
```

```
FROM FIG 2
116   case digits:
117     x->time = seconds(6);
118     switch(op) {
119     default:
120       goto error;
121   case Cronhook:        //line was hung up
122     send(x, Ctdis, 0);
123     x->state = idle;
124     break;
125
126   case Crtone:          //noise (dial tone or silence has been applied)
127     break;              //no state change
128
129   case Crdigit:         //next digit detected
130     p = dialplan(x->digits, x->ndigits);  //decode digits according to dial plan
131     if(x->ndigits == 1)                   //first digit
132       send(x, Cttone, 0);                 //remove dial tone
133     if(p == 0)                            //incomplete
134       break;                              //no state change
135
136     // translate local number to local phone
137     x->term = lookup(p);
```

```
     FROM FIG 2
141     if(x->term == 0) {
142         send(x, Cttone, Treorder);
143         x->state = busy;
144     } else {
145         send(x->term, Ctring, 1);      //ring destination
146         x->state = digits_2);
147     }
148     break;
149
150  case Crtime:
151     send(x, Ctdis, 0);
152     send(x, Cttone, Tscream);
153     x->state = busy;
154     break;
155
156     break;
 ⋮
158  case idle:
159     switch(op) {
160     default:
161         print("%L idle and op=%s/n", x, istring(op));
162         break;
163
164  case Crdtmf:
165  case Crdis:
166  case Cronhook:
167  case Crtone:
168     break;
169
170  case Croffhook:
171     x->ndigits = 0;
172     send(x, Ctdtmf, 1);
173     x->state = tmp_f;
174     break;
175
176     break;
```

220, 225

```
 ⋮
178  case ring:     //one phone has audible ringing, other phone
179     switch(op) {                                //is ringing
180     default:
181         goto error;
182
183  case Cronhook:
184     send(x->term, Ctdis, 0);
185     send(x, Ctdis, 0);
186     x->state = idle;
187     break;
188
189  case Crtone:
190     x-.state = ring;
191     break;
192
193  case Cranswer:
194     send(x, Ctconn, x->term->lineo);   // cross connext the phones
195     send(x->term, Ctconn, x->lineo);
196     x-vstate = conn;
197     break;
198
199     break;
200
201  case tmp_1:
202     switch(op) {
203     default:
204         goto error;
205
206  caseCronhook:
207     send(x, Ctdis, 0);
208     x->state = idle;
209     break;
210                                            // line was hung up
```

```
211      case Crtmf:
212         send(x, Cttone, Tdial);        //digit dectector is active
213         x->state = tmp_2;              //apply dial tone
214         break;
215      }
216      break;
217
218   case tmp_2:
219      switch(op) {
220      default:
221         goto error;
222
223      case Cronhook:                     //line was hung up    225
224         send(x, Ctdis, 0);
225         x-.state = idle;
226         break;
227
228      case Crdigit:                      //first digit (even before giving
229         x = digits;                     //  dial tone)
230         goto more;                      // no return, continue
231
232      case Crtone:                       //dial tone has been applied
233         break;
234      }
235      x-state = digits;
236      break;
237
238   case tmp_3:
239      switch(op) {
240      default:
241         goto error;
242
243      case Cronhook:                                            230
244         send(x->term, Ctdis, 0);       // on hook
245         send(x, Ctdis, 0);
246         x->state = idle;
247         break;
248      case Crbusy:
249         send(x, Cttone, Tbusy);        // is busy
250         x->state + busy;
251         break;
252
253      case Crring:                      // is ringing
254         send(x, Cttone, Tring);        //  apply audible ringing tone
255         x->state = ring;
256         break;
257      }
258      break;
259   )
260   return;
261
262   error;
263   printf("error: line=%d os=%s op=%s/n",
264           x->lineo, stname(x->stste), istring(op));
265      x->state = idle;
266      goto more;                         // continue processing
267   }
268 )
```

FROM FIG 3

```
1   #include <u.h>
2   #include <libc.h>
3
4   enum
5   {
6       /* operations */
7       Ctprovlc,
8       Crprovlc,
9       Cldtmf,
10      Crdtmf,
11      Ctdis,
12      Crdis,
13      Cttone,
14      Crtone,
15      Ctring,
16      Crring,
17      Ctconn,
18      Crconn,
19      Croffhook,
20      Cronhook,
21      Cranswer,
22      Crbusy,
23      Crdigit,
24      Crtime,
25
26      /* tones */
27      Tnone,
28      Tdial,
29      Tring,
30      Tbusy,
31      Treorder,
32      Tscream,
33  };
34
35  typedef     struct Line Line;
36
37  struct Line
38  {
39      int     lineno;
40      char    digits[24];
41      int     ndigits;
42      int     state;
43      int     time;
44      Line*   term;
45  };
46  extern  char*   istring(int);
47  extern  void    send(Line*, int, int);
48  extern  Line*   lookup(int);
49  extern  int     dialplan(char*, int);
50  extern  char*   stname(int);
51  extern  int     seconds(int);
52  extern  int     debug;
53
54  void
55  state(int lineno, int op)
56  {
57      Line *x;
58      int p, os;
59      goto start;
60  /*
61   * phone is unassigned
62   */
63  dead:
64                  ── TO FIG 5A
```

```
 71   switch(op) {
 72   default:
 73     print("%L dead and op = %s\n", x, istring(op));
 74     goto Bdead;
 75   case Crprovlc:  //line is successfully provisioned
 76     break;
 77   }
 78   x->term = 0;
 79
 80  /*
 81   * phone is on hook
 82   */
 83  @idle:
 84   switch(op) {
 85   default:
 86     print("%L dead and op = %s\n", x, istring(op));
 87     goto Bdead;
 88   case Crdtmf:       //noise (dtmf has been removed)
 89   case Crdis:        //noise (line has been disconnected)
 90   case Cronhook:     //noise (line has been hung up)
 91   case Crtone:       //noise (tone has been applied)
 92     goto Bdead;
 93   case Croffhook:    //line is offhook
 94     break;
 95   }
 96   x->ndigits = 0;
 97   send(x, Ctdtmf, 1);   //connect digit detector
 98  @:switch(op) {
 99   default:
100     goto error;
101   case Cronhook:
102     send(x, Ctdis, 0);
103     goto Bidle;
104   case Crdtmf:        //connect digit detector
105 111  @:switch(op) {
106 112  default:
107 113    goto error;
108 114  case Cronhook:     //line was hung up
109 115    send(x, Crdis, 0);
110 116    goto Bidle;
117  case Crdigit:        //first digit (even before giving dial tone)
118    goto Adigits;
119  case Crtone:         //dial tone has been applied
120    break;
121  }
122  @digits
123  x->time = seconds(6);
124  switch(op) {
125  default:
126    goto error;
127  case Cronhook:       //line was hung up
128    send(x, Ctdis, 0);
129    goto Bidle;
130  TO FIG 6
```

FIG. 6

```
       FROM FIG 5A
135    case Crtone:
136      goto Bidle;
137    case Crdigit:
138      /*decode the digits according to the dial plan*/
139      p = dialplan(x->digits, x->ndigits);
140      if(x->ndigits == 1)
141        send(x, Cttone, 0);      //remove dial tone
142      if(p == 0)
143        goto Bdigits;
144      break;
145
146
147    case Crtime:
148      send(x, Ctdis, 0);
149      send(x, Cttone, Tscream);
150      goto Bbusy;
151    }
152    /* translate a local number to a local phone */
153    x->term == 0)
154    if(x->term == 0){
155      send(x, Cttone, Treorder);
156      goto Bbusy;
157    }
158    }
159    send(x->term, Ctring, 1);        //ring the destination
160
161  ⓘ: switch(op) {
162    default:
163      goto error;
164
165    case Cronhook:
166      send(x->term, Ctdis, 0);
167      send(x, Ctdis, 0);
168      goto Bidle;
169
170    case Crbusy:
171      send(x, Cttone, Tbusy);        //is busy
172      goto Bbusy;
173
174    case Crring:                     //is ringing
175      break;
176      send(x, Cttone, Tring);        //apply audible ringing tone
177
...
183    ⓘring:
184    switch(op) {
185    default:
186      goto error;
187
188    case Cronhook:
189      send(x->term, Ctdis, 0);
190      send(x, Ctdis, 0);
191      goto Bidle;
192
193    case Crtone:
194      goto Bring;
195
196    case Cranswer:
197      break;
198    }
199
200    send(x, Ctconn, x->term->lineno);  //cross connect the phones
201    send(x->term, Ctconn, x->lineno);
       TO FIG 6A
```

FIG. 6A

```
       @busy
223    switch(op) {
224    case Crfone:
225       goto Bbusy;
226
227    case Cronhook:
228       send(x, Ctdis, 0);
229       goto Bidle;
230    }
231    goto error;
232
233    start:
234    x = lookup(lineno);
235    if(x != 0)
236       os = x->state;
237    switch(os) 
238                    ⓪❶
239    }
240    print("state not found %d\n", x->lineno);
241    return
242
243    error:
244    printf("error: line=%d os=%s op=%s\n", x->lineno,
245       stname(x->state), istring(op));
246    goto Aidle;
247
248    out:
249    if (debug)
250       printf("state: line=%d qs=%s os=%s op=%s ns=%s\n",
251           x->lineno, stname(os), istring(op), stname(x->state));
252
253
254
255    char* snames[] =
256       {
257       ""
258    };
```
555

FROM FIG 6

```
       @conn
206    switch(op) {
207    default:
208       goto Crconn;
209       goto Bconn;
210
211    case Cronhook:
212       send(x->term, Ctdis, 0);
213       send(x, Ctdis, 0);
214       goto Bidle;
215    }
216    goto error;
217
218    /*
219    */*phone is connected to
220    **q tone untill hung up
221    */
222
```
550

```
1  #line 1 "sample.z"
2  #include <u.h>
3  #include <libc.h>
4
5  enum
6  {
7     /* operation */
8     Ctprovlc,
9     Crprovlc,
10    Ctdtmf,
11    Crdtmf,
12    Ctdis,
13    Crdis,
14    Ctone,
15    Crtone,
16    Ctring,
17    Crring,
18    Ctconn,
19    Crconn,
20
21    Crofthook,
22    Cronhook,
23    Cranswer,
24    Crbusy,
25    Crdigit,
26    Crtime,
27
28    /* tones */
29    Tnone,
30    Tdial,
31    Tring,
32    Tbusy,
33    Treorder,
34    Tscream,
35 )*
36
37 typedef      struct Line Line
38
39 struct       Line
40 {
41    int      lineno;
42    char     digits[24];
43    int      ndigits;
44    int      state;
45    int      time;
46    Line*    term;
47 };
48
49 extern char*  istring(int);
50 extern void   send(Line*, int, int);
51 extern Line*  lookup(int);
52 extern int    dialplan(char*, int);
53 extern char*  strname(int);
54 extern int    seconds(int);
55 extern int    debug;
56
57 void
58 state(int lineno, int op)
59 {
60    Line *x;
61    int p, os;
62
63    goto start;
64 /*
65 *phone is unassigned
66 */
67    goto Bdead; Bdead; x->state = 1; goto out; Adead;;
68 #line 68 "sample.z"
69    switch(op) {
70    default:
71        print("%L dead and op=%s\n", x, istring(op));
72        goto Bdead;
73
74    case Crprovlc:   //line is successfully provisioned
75        break;
76    )
77    x->term = 0;
    TO FIG 7A
```

FIG. 7A

```
81  /*
82   * phone is on hook
83   */
84  goto Bidle; Bidle: x-.state = 2; goto out; Aidle;;
85  #line 82 sample.z
86
87  switch(op) {
88  default:
89    print("%l idle and op=%s\n", x, istring(op));
90    goto Bidle;
91
92  case Crdtmf:    ///noise (dtmf has been removed)
93  case Crdis:     ///noise (line has been disconnected)
94  case Cronhook:  ///noise (line has been hung up)      710
95  case Crtone:    ///noise (tone has been applied)
96    goto Bidle;
97
98  case Croffhook:  //line is offhook
99    break;
100
101  x->ndigits = 0;
102  send(x,Crdtmf, 1);  //connect digit detector
103
104  goto Bidle_1; Bidle_1: x->state = 3; goto out; Aidle_1;;
105  #line 100 smaple.z
106  switch(op) {
107  default:
108    goto error;
109
110  case Cronhook:  //line was hung up
111    send(x, Ctdis, 0);
112    goto Bidle;
113
114  case Crdtmf:     //digit detector is active
115    send(x, Crtone, Tdial);  //apply dial tone
116  goto Bidle_2; Bidle_2: x->state = 4; goto out; Aidle_2;;
117  #line 110 sample.z
118  switch(op) {
119
120  default:
121    goto error;
122  case Cronhook:  //line was hung up
123    send(x, Ctdis, 0);
124    goto bidle;
125  case Crdigit:           //first digit (even before giving dial tone)
126    goto Adigits;
127  case Crtone:            //dial tone has been applied
128    break;
129  }
130
131
132  goto Bdigits; Bdigits: x->state = 5; goto out; Adigits;;
133  #line 123 sample.z
134
135  x->time = seconds(6);
136  switch(op) {
137  default:
138    goto error;
139
140  case Cronhook:  //line was hung up
      └─ TO FIG 8
```

```
    FROM FIG 7
141         send(x, Ctdis, 0)
142         goto Bidle;
143
144     case Crtone:                //noise (dial tone or silence has been applied)
145         goto Bidle;
146
147     case Crdigit:           //next digit detected
148         /*decode the digits according to the dial plan*/
149         p = dialplan(x->digits, x->ndigits);
150         if(x->ndigits == 1)
151             send(x, Cttone, 0);    //remove dial tone
152         if(p == 0)
153             goto Bdigits;
154         break;
155
156     case Crtime:
157         send(x, Ctdis, 0);
158         send(x, Cttone, Iscream);
159         goto Bbusy
160
161     /* translate a local number to a local phone */
162     x->term = lookup(p);
163     if (x->term == 0){
164         send(x, Cttone, Treorder);
165         goto Bbusy
166     }
167     send(x->term, Cring, 1);    // ring the destination
168
169     goto Bdigit_1; Bdigit_1: x->state = 6; goto out; Adigits_1;;
170 line 159 sample.z
171     switch(op) {
172     default:
173         goto error;
174
175     case Cronhook:      //on hook
176         sens(x->term, Ctdis, 0);
177         send(x, Ctdis, 0);
178         goto Bidle;
179
180     case Crbusy:            //is busy
181         send(x, Cttone, Tbusy);
182         goto Bbusy;
183
184     case Crring:            //is ringing
185         break;
186
187     send(x, Cttone, Tring,);    //apply audible ringing tone
188     /*
189     *one phone has audible ringing
190     *one phone is ringing
191     */
192     goto Bring; Bring; x->state = 7; goto out; Aring;;
193 line 181 sample.z
194     switch(op) {
195     default:
196         goto error;
197
198     case Cronhook:
199         send(x->term, Ctdis, 0);
200         send(x, Ctdis, 0);
201         goto Bidle;
202
203     case Crtone:
204         goto Bring;
205
206     case Cranswer:
207         break;
208     }
209
210     send(x, Ctconn, x->term, Ctdis, 0);    //cross connect the phones
211     send(x->term, Ctconn, x->lineno);
212     /*
213     *phones are connected
214     */
215     goto Bconn; x->state = 8; goto out; Aconn;;
216 line 204 sample.z
    TO FIG 8A
```

```
FROM FIG 8
221   switch(op) {
222   default:
223   case Crconn:
224       goto Bconn;
225
226   case Cronhook:
227       send(x->term, Ctdis, 0);
228       send(x, Ctdis, 0);
229       goto Bidle;
230   }
231   goto error;
232
233   /*
234    * phone is connected to
235    * q tone until hung up
236    */
237   goto Bbusy; Bbusy: x->state = 9; goto out; Abusy:;
238   #line 221 "sample.z"
239   switch(op) {
240   case Crfone:
241       goto Bbusy;
242
243   case Cronhook:
244       send(x, Ctdis, 0);
245       goto Bidle;
246   }
247   goto error;
248   start:
249   x = lookup(lineno);
250   if(x | = 0) {
251       os = x->state;
252       switch(os) {
253       case 1: goto Adead;
254       case 2: goto Aidle;
255       case 3: goto Aidle_1;
256       case 4: goto Aidle_2;
257       case 5: goto Adigifs;
258       case 6: goto Adigifs_1;
259       case 7: goto Aring;
260       case 8: goto Aconn;
261       case 9: goto Abusy;
262       }
263       #line 237 "sample.z"
264       )
265       print("state not found %d\n", x->lineno);
266   }
267   return;
268
269   error:
270       print("error: line=%d os=%s op=%s\n", x->lineno, stname(os), istring(op));
271       goto Aidle;
272   out:;
273       if(debug)
274           print("state: line=%d os=%s op=%s ns=%s\n",
275                 x->lineno, stname(os), istring(op), stname(x->state));
276   }
277
278   snames()
279   {
280       char*    snames() {
281                "dead",   1.
282                "idle",   2. 5.
283                "digits", 7.
284                "ring",   8.
285                "conn",   9.
286                "busy",
287                0
288       #line 255 "sample.z"
289       };
```

FIG. 10

```
1  /*
2   *generated from 'state.z' - Wed Dec 9 10:08:54 1998
3   */
4   %c_template "state_c.tpl"
5   %p_template "state_p.tpl"
6   %p_map      state.map
7   ;
8   %event  Cranswer
9   %event  Crbusy
10  %event  Crconn
11  %event  Crdigit
12  %event  Crdis
13  %event  Crdtmf
14  %event  Croffhook
15  %event  Cronhook
16  %event  Crprovlc
17  %event  Crring
18  %event  Crtime
19  %event  Crtone
20  ;
21  %state  S_dead
22  %state  S_idle
23  %state  S_idle_1
24  %state  S_idle_2
25  %state  S_digits
26  %state  S_digits_1
27  %state  S_ring
28  %state  S_conn
29  %state  S_busy
30  ;
31  S_dead     :else S_dead
32  {print("%L dead and op=%s\n", x, istring(op)); /* #73 */; }
33  | Crprovlc S_idle
34  { x->term = 0; /* #79 */; }
35  ;
36
37  S_idle     :else S_idle
38  {print("%L idle and op+%s\n", x, istring(op)); /* #87 */; }
39  | Crdtmf
40  + Crdis
41
42  + Cronhook
43  + Crtone S_idle
44  | Croffhook  S_idle_1
45  { (x->ndigits=0;  /* #99 */;
46   send(x, Crdtmf, 1); /* #100 */; }
47  ;
48
49  S_idle_1: else "error"
50  | Cronhook S_idle
51  { send(x, Crdis, 0); /* #107 */; }
52  | Crdtmf  S_idle_2
53  { send(x, Crtone, Tdial); /* #111 */; }
54  ;
55
56  S_idle_2: else "error"
57  | Cronhook S_idle
58  { send(x, Crdis, 0); /* #116 */; }
59  | Crdigit @S_digits
60  | Crtone  @S_digits
61  ;
62
63  S_digits: onreceipt
64  ( x->time==seconds(6); /* #126 */; }
65  :else "error"
66  | Cronhook S_idle
67  { send(x, Crdis, 0); /* #132 */; }
68  | Crtone @S_digits_E6
69  | Crdigit @S_digits_E6
70  { p=dialplan(x->digits, x->ndigits); /* #140 */; }
71  | Crtime S_busy
72  { send(x, Crdis,0); /* #148 */;
73    send(x, Ctone, Tscream); /* #149 */; }
74  ;
75  S_digits_E6: (x->ndigits == 1) @S_digits_E7
76  { send(x, Crtone, 0); /* #142 */; }
77  | else @S_digits_E7
78  ;
79
80  S_digits_E7: (p == 0) S_digits
81  | else @S_digits_E8
```

```
 83    (x->term=lookup)(p);  /* #154 */;
 84  ;
 85  S_digits_E8: (x->term == 0) S_busy
 86      (send(x, Ctone, Treorder);  /* #156 */;
 87    else S_digits_1
 88      (send(x->term, Ctring, 1);  /* #159 */;
 89  ;
 90
 91  S_digits_1: else "error"
 92  |Cronhook S_idle
 93      (send(x->term, Ctdis, 0);  /* #166 */;
 94      (send(x, Ctdis, ));  /* #167 */;}
 95  | Crbusy S_busy
 96      (send(x, Ctone, Tbusy);  /* #171 */;
 97  | Crring S_ring
 98      (send(x, Ctone, Tring);  /* #177 */;
 99  ;
100
101  S_ring  : else "error"
102  |Cronhook S_idle
103      send(x->term,Ctdis,0)
104      send(x,Ctdis,0) ;  /* #189 */;
105  |Crtone S_ring                      /* #196 */;}
106  |Cranswer S_conn
107      send(x,Ctconn,x->term->lineno};  /* #200 */;
108      send(x->term,Ctconn,x->lineno);  /* #201 */;
109  ;
110
111
112  S_conn  :else
113  +Crconn S_conn
114  |Cronhook S_idle
115      (send(x->term, Ctdis, 0);  /* #213 */;
116      send(x, Ctdis, 0);  /* #214 *//
117  ;
118
119  S_busy  :else "error"
120  |Crtone S_busy
121  |Cronhook S_idle
122      (send(x, Ctdis, 0);  /* #229 */;
123  ;
124
```

1000

1050 (brace around lines 102–110)

FIG. 11

```
 1 # Names of events introduced only here:
 2   %event   CIconn
 3   %event   CIdis
 4   %event   CIdtmf
 5   %event   Cring         ⎫
 6   %event   CIanswer      ⎬ 1120
 7   %event   CIbusy        ⎭
 8
 9
10 # Statements that are not the target of this check:
11
12   p=dialplan(x->digits, x->ndigits)    true  /*not target of this check*/
13   x->ndigits=0                         true  /*ditto*/
14   x->term=0                            true
15   x->term=lookup(p)                    true
16   print                                true
17   send(x, Ctone, 0)                    true
18   send(x, Ctone, Tbusy)                true
19   send(x, Ctone, Tdial)                true
20   send(x, Ctone, Treorder)             true
21   send(x, Ctone, Tring)                true
22   send(x, Ctone, Tscream)              true
23
24 # allow these properties to be assumed either true
25 # or false (introducing non-determinism in the abstraction):
26
27   (x->ndigits==1)                      true  /*assume condition true*/
28   !((x->ndigits==1))                   true  /* or its negation true */
29   (p==0)                               true  /*ditto*/
30   ...
31   !((p==0))                            true
32   (x->term==0)
33   !((x->term==0))
34
35 # Statements that are relevant and directly represented:
36
37
38   x->time=seconds(6)          Timer = true   /*start timeout timer*/
39   send(x, Ctconn, x->term->lineno)  acs!CIconn  /*send g message*/
40   send(x, Ctdis, 0)                  acs!CIdis   /*ditto*/
41   send(x, Ctdtmf, 1)          acs!Ctdtmf
42   send(x->term, Ctconn, x->lineno)   acs!CIconn
43   send(x->term, Ctdis, 0)            acs!Crdis
44
45 # Nondeterministically abstract in one of two ways:
46
47   send(x->term, Cring, 1)     if :: acs!Cring; acs!CIanswer
                                   :: acs!Ctbusy fi
```

```
 1  /*
 2   * source: state
 3   */
 4
 5  /* state.x, 12 states */
 6  mtype = {
 7      Crtone,
 8      Crtime,
 9      Crring,
10      Crprovlc,
11      Cronhook,
12      Croffhook,
13      Crdtmf,
14      Crdis,
15      Crdigit,
16      Crconn,
17      Crbusy,
18      Cranswer,
19      Ctbusy,
20      Ctanswer,
21      Ctring,
22      Ctdtmf,
23      Ctdis,
24      Ctconn,
25  };
26
27  chan talk = [0] of {byte, short, byte};
28
29  #include "state.1" /* catch -v -1 */
30
31  /* spin template */
32
33  chan acs = [4] of {mtype};
34  chan qin = [0] of {mtype};
35
36  bool dialtone = false;
37  bool Timer = false;
38
39  proctype state (byte who)
40  {   byte op;
41
42  BS_dead:
43      talk!2, 9, who; /* < stste S_dead> */
44  S_dead:                                         1200
45      atomic {qin?op -> talk!0, op, who};
46      if
47      :: op == Crprovlc ->
48          A_S_dead_Crprovlc;
49          /* (x->term=0; ** #79 **;) */
50          goto BS_idle;
51      :: else ->
52          A_S_dead_else;
53          /* (printf("%L dead and op=%s\n", x, istring(op)); ** #73 **;) */
54          goto BS_dead;
55      fi;
56  BS_idle:
57      talk!2, 8, who; /* <state S_idle> */
58  end_S_idle:
59  S_idle:
60      atomic {qin?op -> talk!0, op, who};
61      if
62      :: op == Croffhook ->
63          A_S_idle_Croffhook;
64          /* (x->ndigits=0; ** #99 **;
65             send(x, Crdtmf, 1); ** #100 **;) */
66          goto S_idle_1; /* <state S_idle_1 > */
67      /* talk!2, 7, who; /* <state S_idle_1 > */
68  S_idle_1:
69      atomic {qin?op -> talk!0, op, who};
70      if
71      :: op == Crdtmf ->
72          A_S_idle_1_Crdtmf
73          /* (send(x, Crtone, Tdial); ** #111 **;) */
74          /* S_idle_2; */
75      /* talk!2, 6, who; /* <state S_idle_2 > */
76  S_idle_2:
77      atomic {qin?op -> talk!0, op, who};
78      if
79      :: op == Crtone ->
80          goto BS_digits;
81      :: op == Crdigit ->
82          goto AS_digits;

```
 83   :: op == Cronhook ->
 84      A_S_idle_2_Cronhook;
 85      /* (send(x, Ctdis, 0); ** #116 **; 0 */
 86      goto B_idle;
 87      else ->
 88      goto error;
 89   fi;
 90   :: op == Cronhook ->
 91      A_S_idle_1_Cronhook;
 92      /* (send(x, Ctdis, 0); 88 #107 88; ) */
 93      goto B_idle;
 94      else ->
 95      goto error;
 96   fi;
 97   :: op == Crtone ->
 98      goto BS_idle;
 99   :: op == Cronhook ->
100      goto BS_idle;
101   :: op == Ctdis ->
102      goto BS_idle;
103   :: op == Crdymf ->
104      goto BS_idle;
105      else ->
106      A_S_idle_else;
107      /* (printf("%_idle and op=%s\n", x, istring(op)); ** #87 **; ) */
108      goto BS_idle;
109   fi;
110  BS_digits:
111   talk!2, 5, who; /* <state S_digits> */
112  S_digits:
113   atomic (qin?op -> talk!0, op, who);
114  AS_digits:
115   A_S_digits_recpt;
116   if (x->time==seconds(6); ** #126 **; ) */
117   :: op == Crtime ->
118      A_S_digits_Crtime;
119      /* (send(x, Ctdis, 0); ** 148 **; ** #149 **;
120      send(x, Cttone, Tscream);
121      goto BS_busy;
122   :: op == Crdigit ->
123      A_S_digits_Crdigit;
124

125      /* (p=dialplan(x->digits, x->ndigits); ** #140 **; ) */
126      /* S_digits_e6; */ /* < state S_digits$200 > */
127   talk!2, 0, who;; /* (x->ndigits == 1) */
128   if
129   :: C_S_digits_e6_1 -> /* (x->ndigits == 1) */
130      A_Sdigits_E6_1;
131      /* (send(x, Cttone, 0); ** #142 **; ) */
132      goto AS_digits_E7;
133   :: C_S_digits_E6_else ->
134      goto AS_digits_E7;
135   fi;
136   :: op == Crtone ->
137      goto BS_digits;
138   :: op == Cronhook ->
139      A_S_digits_Cronhook;
140      /* (send(x, Ctdis, 0); ** #132 **; ) */
```

FIG. 13

```
FROM FIG 12
141      goto BS_idle;
142   :: else ->
143      goto error;
144   fi;
145 BS_busy:
146   talk!2, 1, who;  /* <state S_busy> */
147 S_busy:
148   atomic (qin?op -> talk!0, op, who);
149   if
150   :: op == Cronhook ->
151 A_S_busy_Cronhook;
152      /* (send(x, Ctdis, 0); ** #229 **; ) */
153      goto BS_idle;
154   :: op == Crtone ->
155      goto BS_busy;
156   :: else ->
157      goto error;
158   fi;
159 B_S_digits_E7:
160 A_S_digits_E7:
161   talk!2, 2, 0, who;  /* <state S_digits_E7 > */
162   if
163   :: C_S_digits_E7_1 -> /* (p == 0) */
164      goto BS_digits;
165   ::C_S_digits_E7 else ->
166 A_S_digits_E7_2;
167      /* (x->term=lookup(p); ** #154 **; ) */
168 S_digits_E8: */ /* <state S_digits_E8> */
169      talk!2, 0, who; /* <state S_digits_E8> */
170      if
171   ::C_S_digits_E8_1 -> /* (x->term == 0) */
172 A_S_digits_E8_1;
173      /* (send(x, Ctfone, Treorder); ** #156 **; ) */
174      goto BS_busy
175   ::C_S_digits_E8 else ->
176 A_S_digits_E8_2;
177      /* (send(x->term, Ctring, 1); ** #159 **; ) */
178      /* S_digits_1; */

179      talk!2, 4, who;  /* <state S_digits_1 . */   1200
180 S_digits_1;
181   atomic (qin?op -> talk!0, op, who);
182   if
183   :: op == Crring ->
184 A_S_digits_1_Crring;
185      /8 (send(x, Crtone, Tring); ** #177 **; ) */
186      goto BS_ring;
187   :: op == Crbusy ->
188 A_S_digits_1_Crbusy;
189      /* (send(x, Ctfone, Tbusy); ** #171 **; ) */
190      goto BS_busy;
191   :: op == Cronhook ->
192 A_S_digits_1_Cronhook;
193      /* (send(x->term, Ctdis, 0); ** #166 **;
194      send(x, Ctdis, 0); ** #167 **; ) */
195      goto BS_idle;
196   :: else ->
197      goto error;
198   fi;
199 BS_ring:
200   talk!2, 3, who; /* ,state S_ring */
201 S_ring;
202   atomic (qin?op -> talk!0, op, who);
203   if
204   :: op == Cranswer ->
205 A_S_ring_Cranswer ->
206      /* (send(x, Ctconn, x->term -> lineno); ** #201 **; *?
207      send(x ->term, Ctconn, x-> lineno); ** #201 **; ) */
208      goto BS_conn;
209   :: op == Crtone ->
210      goto BS_ring;
211   :: op == Cronhook ->
212 A_S_ring_Cronhook;
213      /* (send(x->term, Ctdis, 0); ** #189 **;
214      send(x, Ctdis, 0); ** 190 **; ) */
TO FIG 13A
```

FIG. 13A

```
217  ┌FROM FIG 13
218       goto BS_idle;
219    :: else ->
220       goto error;
221    fi;
222  BS_conn;
223    talk!2, 2, who,  /* < state S_conn > */
224  S_conn;
225    atomic {qin?op -> talk!0, op, who};
226    if
227    :: op == Cronhook ->
228       /* S_conn_Cronhook;
229          send(x,->term, Ctdis, 0); ** #213 **;
230          send(x, Ctdis, 0); ** #214 **;) */
231       goto BS_idle;
232    :: op == Crconn;
233       goto BS_conn;
234    :: else ->
235       goto BS_conn;
236    fi;
237  error;
238    printf("reached error state\N*):
239    assert(false) /*assert that this cannot happen*/
240  }
241
242  proctype context( )
243  { mtype msg;
244
245    end:  do
246    :: Timer && timeout ->    /*the timer expires*/
247         Timer = false;       /*turn it off*/
248         qin!Crtime            /*notify the switch*/
249    :: atomic {
250         acs?msg ->           /*message send to enviroment*/
251         Timer = false        /*on arrival of any event: timer cancels*/
252         if
253
254
255    :: msg == Ctdtmf ->       */digit recognition*/
256         qin!Crdtmf;           /*must acknowledge this event*/
257         dialtone = 1-dialtone /*toggle on-off*/
258
259    :: msg == Ctdis ->
260         qin!Crdis;            /*acknowledge*/
261         dialtone = 1 -dialtone /*disconnecting - dialtone off*/   1200
262
263    :: msg == Cring ->         /*phone rings*/
264         qin!Crring
265
266    :: msg == Ctanswer ->      /*phone answered*/
267         qin!Cranswer
268
269    :: msg == Ctbusy ->        /*phone is busy*/
270         qin!Crbusy
271
272    :: msg == Crdis            msg ==Crconn
273         skip                  /*messages not yet considered*/
274
275    :: else ->                 /*nothing else should happen*/
276         printf("context: cannot happen\n"); /*assert that we cannot reach this*/
277         assert(false)
278         fi
279    }
280    od
281  )
282
283  proctype subscriber( )   /* basic assumptions about
284  subscriber behavior*/
285  {  end:  do
286    :: timeout ->                              /*a valid end-state*/
287         qin!Croffhook;                        /*after the system stabilizes*/
288    do                                         /*start the originating call*/
289    :: dialtone -> qin!Crdigit                 /*dial digits*/
290         qin!Cronhook; break                   /*terminate call*/
291    :: skip -> timeout                         /*or stall and force a timeout*/
292    od
     └ TO FIG 13B
```

FIG. 13B

```
293  FROM FIG 13A
294  pd {
295
296   int (
297   atomic (
298     run state (0);
299     run subscriber ( );
300     run context ( );
301   }
302   gin!Crprovlc     /*provision the phone*/
303
```

FIG. 14

```
1  /*
2  *source: state.x
3  */
4
5  #define A_S_dead_Crprovlc   talk!1,1,who
6  *(x->term==0; #79;) */
7  *(print("Tdeadandop=_s_n", x, istring(pp)); #73;)*/
8  #define A_S_dead_else
9  /*print("Croffhook_true_?8ditto*;acs!Ctdtmf; talk!1,3, who
10 *(x->ndigits==0; #99; send(x, Ctdtmf,1); #100;)*/
11 #define A_S_idle_else    talk!1, 4, who
12 /* (print("Lidleandop=_s_n", x, istring(op); #87;)*/
13 #define A_S_idle_1_Crdtmf       talk!1, 5, who
14 (send(x, Ctfone, Tdial); #111;)*/
15 define A_S_idle_1_Cronhook acs!Ctdis
16 (send(x, Crdis, 0); #107;)*
17 define A_S_idle_2_Cronhook acs!Ctdis
18 #define A_S_digits_recpt   Timer = true   /*start timeout timer */; talk!1,8,who
19 *(x->time=seconds(6); #126;)*
20 #define A_S_digits_Ctfone     acs!Ctdis    /*ditto*/; talk!1,9,who
21 (send(x, Ctdis, 0); #116;)*
22 #define A_S_digits_Crdigit    true   /*ditto*/; ;Tscream); #149;)*/ talk!1,11,who
23 (send(x, Ctfone, 0); #148; send(x,  /*not target of this check */; talk!1,12,who
24 (p=dialplan(x->digits, x->ndigits);  ?8ditto */; talk!1,12,who
25 #define A_S_digits_Cronhook acs!Ctdis
26 (send(x, Crdis, 0); #132;)*     true   /*assume condition true */; talk!1,13,who
27 #define A_S_digits_E6_1        true   talk!1,13,who
28 *(x->ndigits == 1)           #142;)*
29 #define A_S_digits_E6         true   /* or its negation true */; talk!1,15,who
30 (send(x, Ctfone, 0);            #140;)*/
31 #define C_S_digits_E6_else_true
32 *(p == 0)*                      true   talk!1,16,who
33 #define C_S_digits_E7_1        talk!1,17,who
34 (x->term=lookup(p);            #154;)*
35 #define C_S_digits_E7_2         true   /*ditto*/; talk!1,18,who
36 #define C_S_digits_E8_1
37 *(x->term == 0)*
38
39
40

41 #define A_S_digits_E8_1                              talk!1,19,who
42 /* (send(x, Ctfone, Treorder); #156;)*/
43 #define C_S_digits_E8else       talk!1,20,who
44 /* !((x->term ==0))*
45 #define A_S_digits_E8_2  if::acs!Ctring; acs!Ctanswer
46 :: acs!Ctbusy fi; talk!1,20,whp
47 /* (send(x->term, Ctring, 1); #159;)*/
48 #define A_S_busy_Cronhook       acs!Ctdis   talk!1,23,who
49 /* (send(x, Ctdis, 0); #229;)*/
50 #define A_S_digits_1_Ctring     talk!1,23,who
51 /*(send(x, Ctfone, Tring, 1); #177;)*/
52 #define A_S_digits_1_Ctbusy     talk!1,24,who
53 /*(send(x, Ctfone, Tbusy); #171;)*/
54 #define A_S_digits_1_Cronhook acs!Crdis;;acs!Ctdis
55  /*ditto*/; talk!1,25,who
56 #167;  (send(x->term,Ctdis,0);  send(x,Ctdis,0);
57 #define A_S_ring_Cranswer  acs!Ctconn /*send a
58  message */;acs!Ctconn; talk!1,26,who
59 send(x,Ctconn,x->term,Ctconn,x->lineno); #200;
60 send(x->term,Ctconn,x->term,x->lineno) acs!Crdis; acs!Ctdis
61 #define A_S_ring_Cronhook          acs!Crdis; acs!Ctdis
62 /*ditto*/;   talk!1,27,who
63 /*(send(x->term, Ctdis, 0); #189; send
64 (x, Ctdis, 0); #190;)*/
65 #define A_S_conn_Cronhook  acs!Crdis; acs!Ctdis
66 /*ditto*/; talk!1,28,who
67 /*(send(x->term, Ctdis,0); #213; send(x,
68 Ctdis,0); #214;)*/
69
70 inline printmsg (x, y) {     /*eventname*/
                if
                :: x == 0 ->   /*eventname*/
                   if
                   :: y == Crtone  -> printf("Crtone\n")
                   :: y == Crtime  -> printf("Crtime\n")
                   :: y == Crring  -> printf("Crring\n")
                   :: y == Crprovlc -> printf("Crprovlc\n")
```

```
    FROM FIG 14A
143         /*internal state*/
144    :: else ->
145    do
146    :: ts >= 0 -> ts--; printf("    ")
147    :: else -> break
148    od;
149    prinfmsg(tp,op)
150    fi
151    )
152    od
153    )
```

```
1  /* Spin template */
2
⋮
19  prototype context ()
20  {  mtype msg;
21
22  end:    do
23      :: Timer && timeout ->    /* the timer expires */
24              Timer = false;    /* turn it off */
25              qin!Crtime        /* notify the switch */
26
27      :: atomic {
28              acs?msg->         /* message sent to enviornment */
29              Timer = false;    /* on arrival of any event: timer cancels */
30
31          if
32          :: msg == Ctdtmf ->   /* digit recognition */
33              qin!Crdtmf;       /* must acknowledge this event */
34              dialtone = 1 - dialtone  /* toggle on-off */
35
36          :: msg == Ctdis ->
37              qin!Crdis;        /* acknowledge */
38              dialtone = false  /* disconnecting - dialtone off */
39
40          :: msg ==Ctring ->    /* phone rings */
41              qin!Crring
42
43          :: msg == Ctanswer -> /* phone answered */
44              qin!Cranswer
45
46          :: msg == Ctbusy ->   /* phone is busy */
47              qin!Crbusy
48
49          :: msg == Crdis,  msg == Ctconn   msg == Crconn ->
50              skip    /* messages not yet considered */
51
52          :: else ->            /* nothing else should happen */
53              printf("context: cannot happen\n");
54              assert(false)     /* assert that we cannot reach this */
55          fi
56          }
57      od
58  }
⋮
70  od
```

```
 1  Error scenario for specification.                              1900
 2  Reported by a Spin verification
 3
 4
 5  < state S_dead >                    /* control state */
 6  Crprovlc                            /* event received */
 7
 8  {x->term=0; ** #79 **; }
 9
10  < state S_idle >                    /* C code executed */
11  Croffhook                           /* etc. */
12
13  { x->ndigits=0; ** #99 **; send(x,Ctdtmf,1); ** #100 **; }
14
15  < state S_idle_1 >
16  Crdtmf
17
18  { send(x,Cttone,Tdial); ** #111 **; )
19
20  < state S_idle_2 >
21  Crdigit
22
23  { x->time=seconds(6); ** #126 **; }
24  { p=dialplan(x->digits,x->ndigits); ** 140 **; }
25  ((x->ndigits == 1))
26  ((p == 0))
27  { x->term=lookup(p); **154 **;}
28  (x->term == 0)
29  { send(x,Cttone,Treorder); ** #156 **; }
30
31  < state S_busy >                    /* unspecified event */
32  Crdigit
33
34  reached error state                                            1920
35
36  spin: line 239 "state.p", Error: assertion violated
37  spin: trail ends after 79 steps
38  #processes: 5
39          queue 3 (acs):
40          dialtone = 1
41          Timer = 1
42  79:     proc 4 (context) line 245 "state.p" (state 26) <valid endstate>
43  79:     proc 3 (subscriber) line 288 "state.p" (state 9)
44  79:     proc 2 (state) line 240 "state.p" (state 189) <valid endstate>
45  79:     proc 1 (:init:) line 303 "state.p" (state 6) <valid endstate>
46  79:     proc 0 (talker) line 138 "./state/1" (state 145) <valid endstate>
47  5 processes created
```

1510 { lines 4–29 }
1920 { lines 31–37 }

METHOD AND APPARATUS FOR TESTING EVENT DRIVEN SOFTWARE

FIELD OF THE INVENTION

The present invention relates to testing computer software programs and, more particularly, to a technique for testing event driven application programs.

BACKGROUND OF THE INVENTION

In well-known event driven software systems (also referred to in the art as "reactive systems"), certain functionality occurs when an event is generated and communicated to an executing process performing particular actions based upon the occurrence of the particular event. More particularly, event driven software is used to define the behavior of a system, e.g., a computer, in response to events that are generated by other systems, machines or peripheral devices connected thereto. Well-known examples of event driven systems include: telecommunications applications, call-processing software, data communications software, device drivers, and computer interface applications. As will be appreciated, these types of event driven systems are state oriented. That is, in each state of a system, one specific event from a predefined set of events is expected to occur, and the system is designed to respond to the event in a well-defined manner.

Briefly, as is well-known, a state machine converts a time series of event stimuli or input data through some function into a time series of responses or output data. For example, in an event driven system, at each point in time, each machine is in a particular so-called "control state" which defines the events that are expected to be generated by other machines, and the type of responses that are to be generated upon the arrival of each such event. Typically, the response includes the execution of a finite piece of program code, the generation of new events, and the identification of a new control state for the particular machine responding to the incoming events. Thus, the state machine model of the event driven system plays a critical role in the development of the application program code by the programmer for the system.

Typically event driven application software is written in higher level general-purpose programming languages such as the well-known "C" or "C++" programming languages, or a special-purpose language such as the well-known ITU Systems Description Language ("SDL"). In developing the actual program code for such systems it is common to describe the behavior of the relevant machines in terms of state machines. Using a higher level programming language, e.g., C, software programmers will write event driven software code for the particular application. Typically, the software program development begins by reviewing a so-called system specification which provides a logical description of the desired operations for the application. Working from the specification, one or more programmers will write the necessary code to implement the operations.

This conventional programming process results in an application program which contains no particular visual context amongst and between the various control states of the event driven system. That is, the program code can be viewed as one large "flat" file with a series of program instructions. Further, as the original specification changes during program development, e.g., additional functionality is added to the system, the requisite program code and additional control states are typically added to the source program in a somewhat arbitrary order. In order for a programmer to understand the logical flow from control state-to-control state directly from the program source code it is necessary to manually trace the execution thread through the source, e.g., tracing branch instructions or "goto" statements. As will appreciated, the tracing of such logical flow, particularly in very large source code programs, is a tedious and time consuming task. This also leads to certain complexity in the testing of the software for so-called "bugs" and to determine whether the application program implements the desired features.

More particularly, a critical state in the development of the application software code for such systems is the testing of the code to validate the properties of the software and to insure that the behavior of the system complies with the design objectives. There are a number of well-known methods for testing event driven software. For example, Boris Beizer, *Black-Box Testing: Techniques for Functional Testing of Software and Systems,* John Wiley and Sons, 1984, describes a well-known testing arrangement wherein a set of test goals is defined from which a limited set of test sequences is deduced. Typically, the set of test sequences is defined through a manual process by the testing engineer through examination of the system design. The set of test sequences is applied to the event driven software under test and either a "pass" or "fail" is recorded as the testing result. This testing methodology is typically applied to general software testing and is well-known in the art to be prone to human error and incomplete. In particular, the number of possible executions of the event driven software under test is incredibly large. In contrast, the number of tests that can be performed on the software with real-time executions is limited by certain practical constraints such as the minimum time required to perform a single test from the total number of tests. As such, it is typical that no more than a few hundred tests can be selected and applied in accordance with this methodology. This results in a very low confidence level in the testing coverage.

A second event driven software method known in the art is described, e.g., by D. Lee et al, Principles and Methods of Testing Finite State Machines—A Survey, *Proceedings of the IEEE,* Vol. 84, pp. 1090–1126, 1996. In accordance with this testing method, an abstract state machine model for the event drive software program is constructed. The state machine model typically captures only a high-level description of the program code thereby leaving out most of the program details. Thereafter, well-known test sequence generation algorithms (see, e.g., Lee, supra.) can be applied to the state machine model from which a relatively small set of tests is derived and applied to the software under test. As with the above-described testing method, this technique relies heavily on the manual construction of the abstract model of the event driven software. Therefore, this technique is sensitive to certain errors caused by mismatches between the formal relation between the software under test and the abstract model to be used for deriving the applicable tests. In addition, changes to the event driven software require the development of new tests which proves cumbersome and time consuming.

In a third commonly used testing method, see, e.g., C. H. West, Protocol Validation by Random State Exploration, *Proc. 6[th] IFIPWG 6.1 Int. Workshop on Protocol Specification, Testing, and Verification,* North-Holland Publ., pp. 233–242, 1986, a random exploration of the full behavior of the event driven software is undertaken in order to establish the software's compliance with the desired properties. The amount of detail in the full software description generally precludes any attempt to perform an exhaustive exploration of the software for testing purposes.

Therefore, well-known statistical algorithms are used to extract and analyze random samples of the software's behavior. However, as with the other above-described testing arrangements, one recognized drawback in this testing approach is that the amount of extraneous detail in the full software description prevents an efficient exhaustive exploration of the full behavior of the software for compliance with high-level properties.

Therefore, a need exists for a technique that mitigates the above-described problems in the art and improves the programming development and testing of event driven software.

SUMMARY OF THE INVENTION

The present invention provides a technique for testing event driven software directed to the efficient testing of event driven software and making it possible to track the validity of future changes to the program code, as part of the normal maintenance, extension and revision process to the source code. More particularly, in accordance with the preferred embodiment of the invention, event driven software code is specified and written in accordance with the principles of the co-pending, commonly assigned patent application, entitled "Method and Apparatus For Developing Event Driven Software", application Ser. No. 09/212,069, filed on event date herewith. That is, in accordance with the preferred embodiment, the source code program is defined and structured into control-sensitive and non-control-sensitive format. In accordance with the present invention, the event driven source code program is parsed to extract the control states defined in the source program, and to convert the source code into an intermediate state machine format. Thereafter, in accordance with the invention, the intermediate state machine format is converted into a automata-based format for modeling checking purposes.

In particular, in accordance with the preferred embodiment, the intermediate state machine format is converted into an annotated automaton model. Illustratively, the annotated automaton model is a verification program written in the input language of a specific model checker. Importantly, in accordance with the invention, each statement from the source code program is mapped onto an abstraction within the automaton model. The mapping is achieved using a translation map which is defined at the initial stage of the verification process. The map need not be revised thereafter unless new types of instructions are introduced, e.g., after revisions are made to repair programming faults, into the source program. The mapping, inter alia, dictates a fixed translation of the particular statement into the target language of the model checker. Thus, instructions that appear in the map are systematically converted into the automaton model wherever such instructions appear in the source code.

In addition to the above-described map, in accordance with the invention, a so-called environment model is defined which encapsulates a minimal set of assumptions that must be made about the particular operating environment in which the event driven application is executed. More particularly, as the model checker input language is provided to the model checker, the environmental model is applied. As a result, in accordance with the preferred embodiment of the invention, the verification of the properties of the event driven system is made subject to the environmental model during the testing and checking of the event driven software by the verification system. Thereafter, the testing and checking results are output, in a well-known manner, by the model checker for determining whether the event driven system conforms with the user's desired execution properties and behaviors.

Advantageously, in accordance with the invention, the model extraction process and application of the model checker occurs in a direct and dynamic fashion from the event driven system program code without the need for user intervention.

BRIEF DESCRIPTION OF THE DRAWINGS

FIGS. 2, 2A, 3 and 3A show an example of a conventional C source code program for an illustrative telecommunications call processing application useful in the illustrative event driven system of FIG. 1;

FIGS. 5, 5A, 6 and 6A show an illustrative C source code program, structured and defined in accordance with the software development operations of FIG. 4, for the illustrative telecommunications call processing application of FIGS. 2 and 3;

FIGS. 7, 7A, 8 and 8A show a translated source code program derived, in accordance with the principles of the invention, from the illustrative C source code program of FIGS. 5 and 6;

FIGS. 10 and 10A show intermediate state machine code derived from the illustrative C source code program of FIGS. 5 and 6;

FIG. 11 shows an illustrative map for the event driven system defined by the illustrative C source code program of FIGS. 5 and 6;

FIGS. 12, 12A, 13, 13A and 13B show model checker input language derived from applying the illustrative map of FIG. 11;

FIGS. 14, 14A and 14B show an illustrative set of library functions for use with the model checker input language of FIGS. 12 and 13;

FIG. 15 shows an illustrative environmental model for the telecommunications processing application described in FIGS. 5 and 6;

FIG. 19 shows an illustrative error trace, generated in accordance with the principles of the invention, for the telecommunications processing application described in FIGS. 5 and 6.

Throughout this disclosure, unless otherwise noted, like elements, blocks, components or sections in the figures are denoted by the same reference designations.

DETAILED DESCRIPTION

A portion of the disclosure of this patent document contains material which is subject to copyright protection.

The copyright owner has no objection to the facsimile reproduction by anyone of the patent document or the patent disclosure, as it appears in the Patent and Trademark Office patent file or records, but otherwise reserves all other rights with respect to the copyrighted works whatsoever.

The present invention provides a technique for testing event driven software. In accordance with various aspects of the invention, the event driven system program source code is directly converted to a automaton based model useful in verifying that the program code complies with the desired properties defined by the user. More particularly, in accordance with a preferred embodiment of the invention, the event driven system program code is translated into a target language for a particular model checker. Such a translation results in a model which contains statements directed at whether execution of the program code will affect the behavior of the event driven system, e.g., the execution of the program code causes new events to be generated. Thus, this model extraction process of the preferred embodiment of the invention can be used as input to a logic model checker for determining whether event driven system complies with the desired correctness properties specified by the user. Advantageously, in accordance with the invention, the model extraction process and application of the model checker occurs in a direct and dynamic fashion from the subject event driven system program code without the need for user intervention.

The present invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Figure 1:
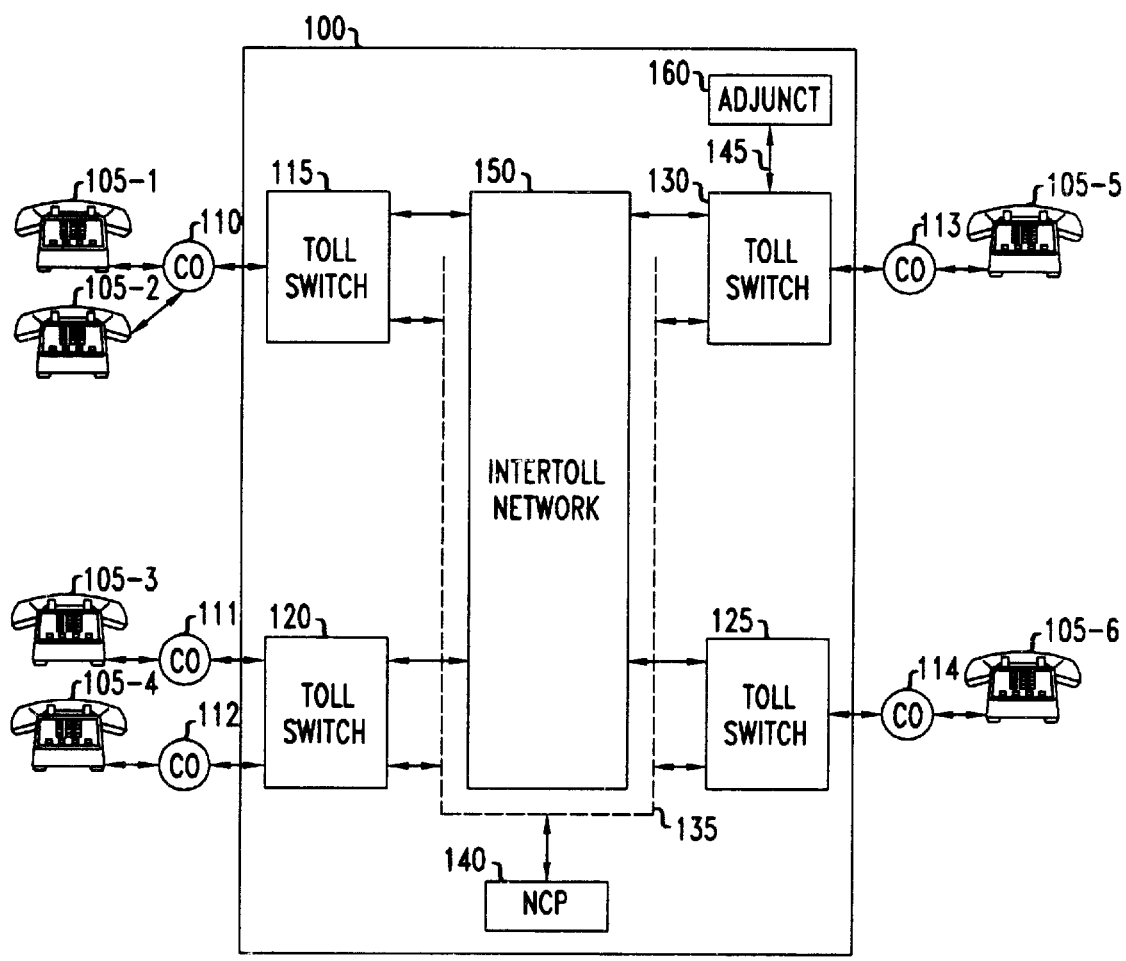
FIG. 1 is a block diagram of an illustrative event driven system.

In order to provide context and facilitate an understanding of the invention, an overview and discussion of an illustrative event driven system will now be presented. In particular, FIG. 1 shows a block diagram of an illustrative communications network which, as will appreciated, contains a myriad of event driven applications. Communications network 100, e.g., is a public switched telephone network such as the well-known inter-exchange network of AT&T Corp., that provides long distance telephone services for its subscribers. These subscribers access communications network 100 through, e.g., communications devices 105-1 through 105-6, which are, e.g., customer premise equipment, wired telephones, personal computers, cellular telephones, pagers and facsimile machines. Communications network 100 includes, inter alia, a plurality of toll switches, e.g., shown in FIG. 1 as toll switches 115, 120, 125, and 130. These toll switches may be any of the well-known types of telecommunications switching equipment, e.g., the No. 4ESS® (Electronic Switching System) or the No. 5ESS® available from Lucent Technologies Inc., 600 Mountain Ave., Murray Hill, N.J. 07974. As shown in FIG. 1, each of toll switches 115, 120, 125, and 130 are connected to a number of other switches via a so-called inter-toll network shown as block 150. Each toll switch may also be connected to multiple central offices ("CO"), e.g., CO's 110 through 114. The operation of such telecommunications networks and CO's is well-known, e.g. as discussed in "Engineering and Operations in the Bell System", Second Edition, Eighth Printing, International Standard Book Number 0-932764-04-5, 1993, and the detail of which will not be further discussed herein. In short, a CO is arranged to extend to a corresponding toll switch of communications network 100 a telephone call originating at, e.g., communications device 105-1, from which a calling party has dialed a particular telephone number. The CO, e.g., CO 110, is further arranged to extend the call connection to, e.g., communications device 105-6 associated with the called party and to the CO, e.g., CO 114, which receives the extension of the call from the corresponding toll switch, e.g., toll switch 125.

Toll switches 115, 120, 125 and 130 of communications network 100 are interconnected via data link 135, which may be, e.g., the well-known System Signaling 7 ("SS7") network. Communications network 100 is arranged so that the toll switches may exchange data messages with one another to establish a connection between a calling party (e.g., communications device 105-1) and a called party (e.g., communications device 105-6), via communications network 100. That is, the connection is made by extending a call through communications network 100 until the call is completed (e.g., the called party answers the call by going "off-hook") between the calling party and the called party. Communications network 100 further includes a number of centralized databases commonly known as Network Control Points ("NCPs"), a single one of which is shown as NCP 140. As is well-known, NCP's, such as NCP 140, are strategically positioned at various positions within communications network 100 to support various service features accessed and provided through the network such as the well-known "800" or "888" toll-free telephone number services.

As will be appreciated, communications network 100 and the various above-described elements of the network require a myriad of event driven applications. For example, call processing application programs for toll switches 115, 120, 125 and 130 must be developed to facilitate the extension of a call through network 100. In particular, for example, a calling party may wish to utilize communications device 105-1 for placing an outgoing call. Such an event driven call-processing application will include operations, i.e., control states, such as offhook, dial, idle, connect, ring, and busy, to name just a few.

As mentioned above, in accordance with the preferred embodiment of the invention, event driven software code is specified and written in accordance with the principles of the previously cited, co-pending, commonly assigned patent application Ser. No. 09/212,069, entitled "Method and Apparatus For Developing Event Driven Software" (hereinafter referred to as "the Method and Apparatus For Developing Event Driven Software application"). Thus, in order to further facilitate a complete understanding of the present invention, the various aspects of the invention in "the Method and Apparatus For Developing Event Driven Software application" will be now be discussed in some detail.

The various aspects of the invention in that application, provide a programming technique for defining, structuring, and developing event driven software. More particularly, event driven software is structured in two basic parts which are referred to therein and herein specifically as control-sensitive code and non-control-sensitive code. In accordance with the invention, control sensitive code includes the identification of control states, the events that are generated and that must be recognized, and the responses to the arrival of particular events in particular states. Further, within the control-sensitive code defining the system, control states are uniquely identified throughout such program code with a single symbol. The non-control-sensitive code, specified separately from the control sensitive code, is directed at the necessary normal sequential code for programming the event driven system such as the invocation of device drivers, the control of peripheral devices, the updating of tables, variable definition, etc. Advantageously, the invention allows the software developer to structure the event driven software application code such that a clear distinction is made between core control features, i.e., states, events and responses, and extraneous details not directly impacting the behavior of the event driven system. As such, the programmer can determine the exact execution flow from control state-to-control state directly from a cursory examination of the program code itself as the individual control states have a strong visual context. That is, in accordance with the invention, the program source code is structured and defined such that the control states which define the event driven application have a direct and logical, i.e. causal, relationship which is immediately evident from an examination of the source code itself.

More particularly, FIG. 2 and FIG. 3 show an example of a conventional C source code program 200 (delineated by individual program code line numbers 1–268) directed to such an illustrative event driven application for processing an outgoing call. As will be appreciated, source code program 200 defines several control states for the application. See, for example, code sections 205 through 230 which define operations for the following respective control states: busy, conn, dead, digits, idle, and ring. Significantly, however, an examination of source code program 200 does not provide an immediately evident view of the execution thread between the various control states. From a high level programming perspective, there is no direct or logical, i.e. causal, relationship between the various control states defined within the source program code. That is, as mentioned above, in order for a programmer to understand the logical flow from control state-to-control state directly from the program source code it is necessary to trace the execution thread through the source, e.g., tracing branch instructions or "goto" statements. As will appreciated, the tracing of such logical flow, particularly in very large source code programs, is a tedious, unilluminating, error prone, and time consuming task. For example, the source code for implementing all the requisite call processing features of communications network 100 will most likely be on the order of tens of thousands lines of code. This also leads to certain complexity in the testing of the software for so-called "bugs" and to determine whether the application program implements the desired features. Significantly, the novel programming technique is directed to defining, structuring, and coding event driven software which mitigates certain disadvantages of the prior art. In accordance with the invention, control sensitive code includes the identification of control states, the events that are generated and that must be recognized, and the responses to the arrival of particular events in particular states. Further, within the control-sensitive code defining the system, control states are uniquely identified throughout such program code with a single symbol. The non-control-sensitive code, specified separately from the control sensitive code, is directed at the necessary normal sequential code for programming the event driven system such as the invocation of device drivers, the control of peripheral devices, the updating of tables, variable definition, etc.

Advantageously, the invention allows the software developer to structure the event driven software application code such that a clear distinction is made between core control features, i.e., states, events and responses, and extraneous details not directly impacting the behavior of the event driven system. As such, the programmer can determine the exact execution flow from control state-to-control state directly from a cursory examination of the program code itself as the individual control states have a strong visual context. That is, in accordance with the invention, the program source code is structured and defined such that the control states which define the event driven application have a direct and logical, i.e. causal, relationship which is immediately evident from an examination of the source code itself.

In accordance with the preferred embodiment of the invention, a programming extension to the well-known ANSI-standard C programming language is adopted for facilitating the definition, structure and coding of event driven software in accordance with the invention. More particularly, in accordance with the preferred embodiment of the invention, the extension to the ANSI-standard C programming language consists of a single symbol, illustratively chosen to be the well-known ASCII symbol "@", and used for labeling all control states within the control sensitive portion of the program code. That is, the symbol "@" is used as the initial character of all labels that correspond to control states within the program source code. Thus, in accordance with the invention, a program statement prefixed with the "@" label identifies a control state in the program code whereby the current execution of the event driven system waits for the arrival of the next event. Following the arrival of the next event, execution of the subsequent program code follows along with the encoding of the required response to that event, and concluding with a transition to the new, uniquely defined control state. As will be appreciated, the response and the new control state, can be different for each event being processed depending upon operational issues such any state information stored in internal tables, variables, device responses, and the like.

Figure 4:
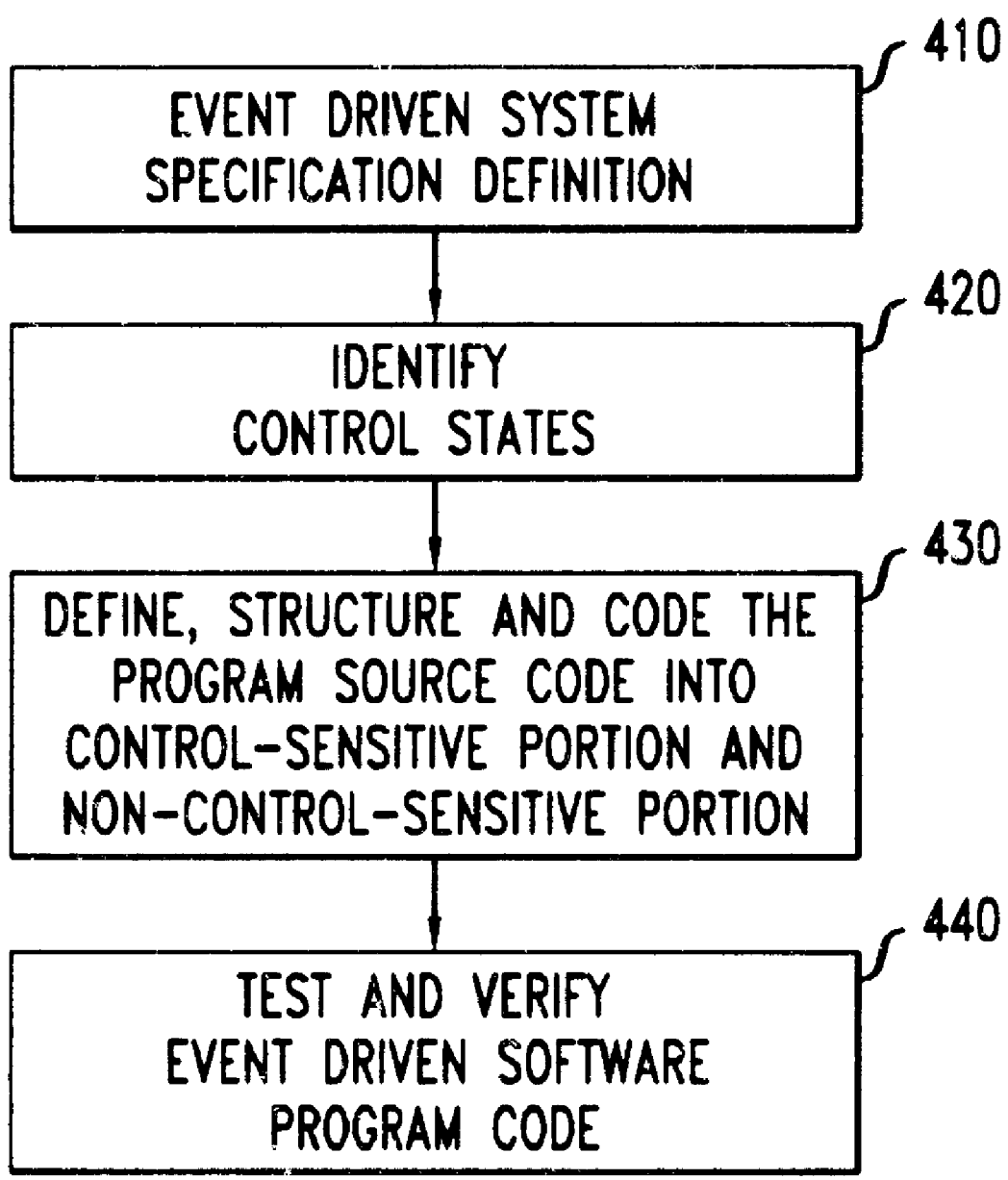
FIG. 4 shows a flowchart of illustrative operations for software development in accordance with the principles of the invention.

FIG. 4 shows a flowchart of illustrative operations for software development in accordance with the principles of the invention. More particularly, a specification for the event driven system to be programmed is defined (block 410), e.g., by the system engineer. As will be appreciated by those skilled in the art, such a specification provides a description of the overall application, e.g., event driven system, for which a software program is to be written and implemented. From the system specification, the control states for implementing the event driven system under development can be identified (block 420) which, in turn, leads to the identification of the events which will be generated and that must be recognized, and the responses to the arrival of particular events in particular states. As such, in accordance with the invention, the definition, structuring, and coding (block 430) of the source code program is divided into two parts, as discussed above, the control-sensitive code and the non-control-sensitive-code.

In accordance with the invention, within the control-sensitive code defining the system, control states are uniquely identified throughout such program code with a single symbol. As discussed above, in accordance with the preferred embodiment of the invention, the symbol "@" is used as the initial character of all labels that correspond to control states within the control-sensitive portion of the overall program source code. Thus, in accordance with the invention, a program statement prefixed with the "@" label identifies a wait-state in the program code, where the current execution of the event driven system waits for the arrival of the next event. Further, the non-control-sensitive code, specified separately from the control sensitive code, is directed at the necessary normal sequential code for programming the event driven system such as the invocation of device drivers, the control of peripheral devices, the updating of tables, variable definition, etc.

Advantageously, the invention allows the software developer to structure the event driven software application code such that a clear distinction is made between core control features, i.e., states, events and responses, and extraneous details not directly impacting the behavior of the event driven system. Thus, one practical result of applying the principles of the invention is the programmer can determine the exact execution flow from control state-to-control state directly from a cursory examination of the program code itself as the individual control states have a strong visual context. That is, in accordance with the invention, the program source code is structured and defined such that the control states which define the event driven application have a direct and logical, i.e. causal, relationship which is immediately evident from an examination of the source code itself. Significantly, our present invention leads to further advantages in the testing and verifying of the event driven software (block 440) to determine if the software satisfies the desired properties as specified by the user. In particular, it is the testing of such event driven software that the present invention is directed and further discussed below in greater detail.

However, continuing with the discussion of "the Method and Apparatus For Developing Event Driven Software application", as mentioned above, that invention allows the software developer to structure the event driven software application code such that a clear distinction is made between core control features, i.e., states, events and responses, and extraneous details not directly impacting the behavior of the event driven system. For example, FIGS. 5 and 6 show an illustrative C source code program 500 (delineated by individual program code line numbers 1–258), structured and defined in accordance with the invention, for the illustrative telecommunications call processing application of FIGS. 2 and 3. In particular, control states 510 through 555 are delineated, in accordance with the preferred embodiment, with the symbol "@" as the initial character of all labels thereby designating the control states within the control-sensitive portion of the overall source code program 500. Thus, source code program 500, in accordance with the invention, has a direct and logical, i.e. causal, relationship between the individual control states, i.e., control states 510–555. Significantly, the programmer can determine the exact execution flow from control state-to-control state directly from a cursory examination of the program code itself as the individual control states have a strong visual context.

For example, through a cursory examination of source code program 500, one can quickly and exactly ascertain when viewing the code at control state 535, i.e., the "@digits" control state, how that particular control state is reached. That is, invocation and execution of this particular event driven system, i.e., the processing of an outgoing call, a control state for allowing the dialing of digits on a telephone device is processed. Control state 535 is such a state and is clearly identifiable beginning at line 125 of code 500, in accordance with preferred embodiment of the invention. In viewing control state 535, one can readily see that the execution flow in reaching this control state is directly through the above-coded control states 510 through 530, respectively. Further, if source code program 500 needs to be revised to add another control state, e.g., to add some further application-specific functionality, the new control state can be placed at the exact location within the existing control state hierarchy without losing context between all the control states.

This logical, i.e. causal, relationship among control states and the clear execution flow directly perceived from viewing source code program 500 is further evident in FIGS. 7 and 8 which show a translated source code program 700 derived from the illustrative C source code program 500 of FIGS. 5 and 6. As mentioned above, in accordance with the preferred embodiment of the invention, the extension to the ANSI-standard C programming language consists of a single symbol illustratively chosen to be the symbol "@" and used for labeling all control states within the control sensitive portion of the program code. The mechanics, i.e. the translator, of the actual translation of the code itself will be readily apparent to those skilled in the art. Thus, translated source code program 700 is the actual fully translated ANSI-standard C representation of the event driven application program in accordance with the invention. For example, control state 515 (i.e., "@idle") of FIG. 5 is translated to program code section 710, and control state 545 (i.e., "@ring") is translated to program code section 720.

The above-described advantages of the invention in "the Method and Apparatus For Developing Event Driven Software application" provide significant utility in the computer programming arts, in particular, to the definition, structure, and development of event driven software application programs. Of course, critical to the successful development of any application program is the effective testing and verification of the program code against a defined set of expected properties. It is the testing of event driven software that the various aspects of the present invention are directed and which now will be discussed in greater detail.

Figure 9:
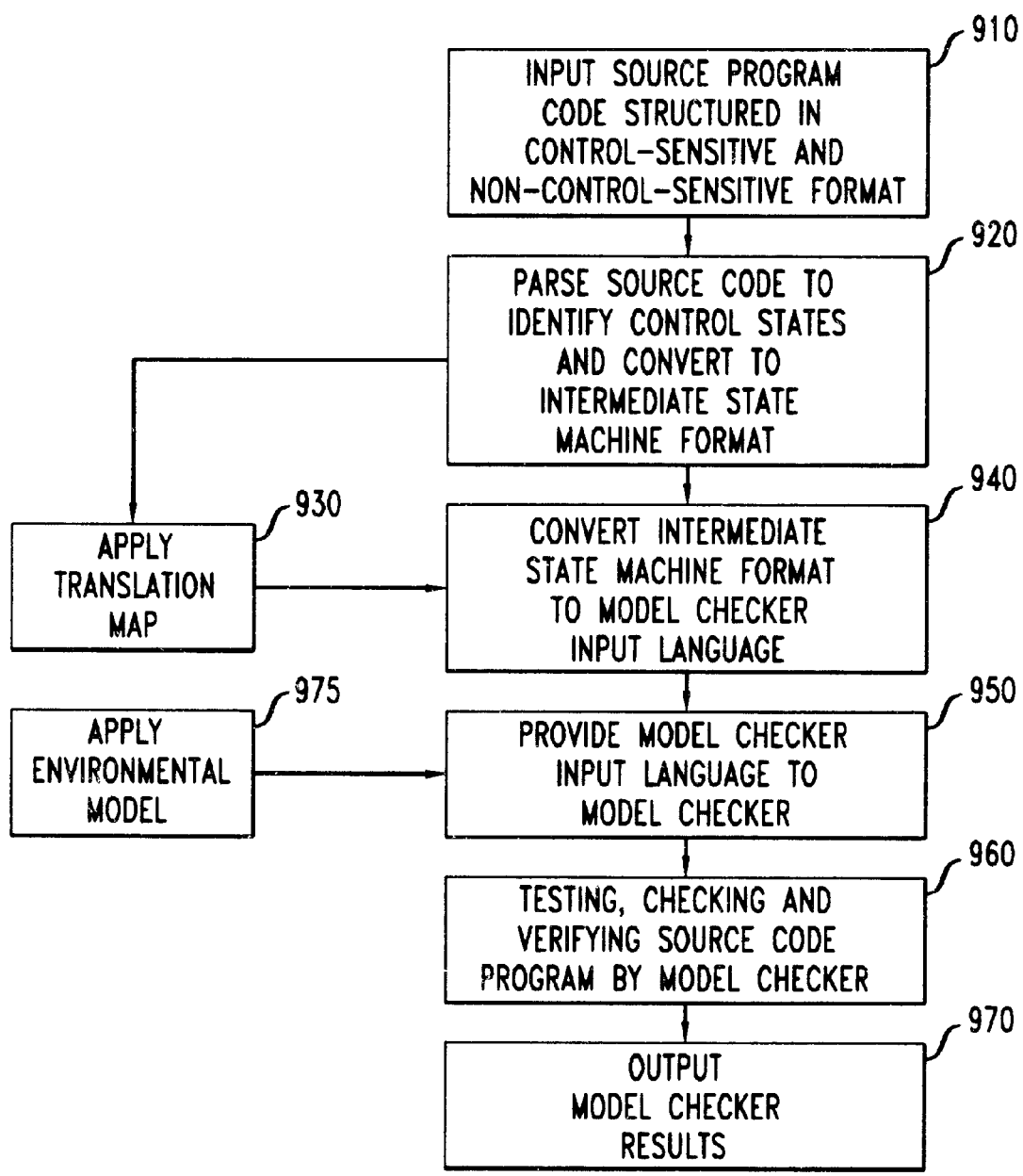
FIG. 9 shows a flowchart of illustrative operations for testing event driven software in accordance with the present invention.

The various aspects of the present invention are directed to the efficient testing of event driven software and making it possible to track the validity of future changes to the program code, as part of the normal maintenance, extension and revision process to the source code. FIG. 9 shows a flowchart of illustrative operations for testing event driven software in accordance with the principles of the invention. More particularly, in accordance with the preferred embodiment of the invention, event driven software code is specified and written in accordance with the principles of the invention in "the Method and Apparatus For Developing Event Driven Software application", as described previously. That is, in accordance with the preferred embodiment, the source code program is defined and structured into control-sensitive and non-control-sensitive format (block 910.) In accordance with the invention, the event driven source code program is parsed to extract the control states defined in the source program, and to convert the source code into an intermediate state machine format (block 920.) Thereafter, in accordance with the invention, the intermediate state machine format is converted into a automata-based format for modeling checking purposes.

In particular, in accordance with the preferred embodiment, the intermediate state machine format is converted into an annotated automaton model in the input language of a specific model checker (block 940). In accordance with the preferred embodiment, the model checker tool is the well-known "SPIN" model checker developed by and available from the Bell Laboratories Division of Lucent Technologies Inc., and as described in more detail, e.g., in G. J. Holzmann, The Model Checker SPIN, *IEEE Trans. On Software Engineering*, Vol. 23, No. 5, pp. 279–295, May 1997, which is hereby incorporated by reference for all purposes. Importantly, in accordance with the invention, each statement from the source code program is mapped (block 930) onto an abstraction within the automaton model. The mapping, discussed below in greater detail, is facilitated by a translation map which is defined at the initial stage of the verification process. The map need not be revised thereafter unless new types of instructions are introduced, e.g., after revisions are made to repair programming faults, into the source program. The mapping, inter alia, dictates a fixed translation of the particular statement into the target language of the model checker. Thus, instructions that appear in the map are systematically converted into the automaton model wherever such instructions appear in the source code.

In addition to the above-described map, in accordance with the invention, a so-called environment model is defined, illustratively by a user, which encapsulates a minimal set of assumptions that must be made about the particular operating environment in which the event driven application is executed. More particularly, as the model checker input language is provided (block 950) to the model checker, e.g., SPIN, the environmental model is applied (block 975). As a result, in accordance with the preferred embodiment of the invention, the verification of the properties of the event driven system is made subject to the environmental model during the testing and checking (block 960) of the event driven software by the model checker. Thereafter, the testing and checking results are output, in a well-known manner, by the model checker (block 970) for determining whether the event driven system conforms with the user's desired execution properties and behaviors.

Important to the above-described testing and checking of event driven software, in accordance with the invention, is the efficient parsing of the event driven source code program to extract the control states defined in the source program, and converting the source code into an intermediate state machine format (see, e.g., FIG. 9, block 920.) That is, to perform model checking efficiently, one must be able to identify the control states, events and actions (i.e., responses) of the event driven system. Thus, a further aspect of the invention is directed to our realization of a formal specification which facilitates the description of an event driven system for model checking purposes, as will now be discussed.

In accordance with this aspect of the invention, a format is defined which facilitates the specification of an event driven system. In accordance with various embodiments of the invention (discussed further below), the specification may be converted into a target programming language, e.g. C., for direct compilation and execution. In accordance with still further embodiments of the invention, the specification is converted, using the above-described mapping, into a logical verification model such as the input language of the SPIN model checking tool. As will be appreciated by those skilled in the art, grammar specification tools are well-known. For example, the YACC (yet-another-compiler-compiler) is one well-known UNIX software utility tool (see, e.g., A. T. Schreiner, Using C with curses, lex and yacc, Prentice-Hall Inc., Englewood Cliffs, N.J. 07632, 1990) which assists programmers in the development of C routines which analyze and interpret an input stream, and also facilitates the development of compilers and interpreters. Similar to YACC, our specification format provides a formalism for describing the grammar of a language, and automating the generation of a compiler for that language. However, our specification format, in accordance with the invention, is directed towards the specification of the behavior of the system.

More particularly, an illustrative grammar definition, in accordance with the preferred embodiment of the invention is as follows:

```
spec:           defs "%%" rules
                ;
defs:           /*empty*/
                |    one_def
                |    one_def defs
                ;
one_def:        "%c_template" "\"" "STRING"\""
                |    "%p_template" "\"" "STRING"\""
                |    "%p_map" "\"" "STRING"\""
                |    "%nparam"NUMBER
                |    "%event" names
                |    "%state" names
                ;
names:          STRING
                |    STRING names
                ;
rules: one_rule
                |    one_rule rules
                ;
one_rule:       source ":" opt_recpt responses";"
                ;
responses:      one_response
                |    one_response "|" responses
one_response:        triggers opt_target opt_action
                ;
triggers:       one_trigger
                |    one_trigger "+" triggers
                ;
one_trigger:event
                |    "("condition")"
                |    "!("condition")"
                |    "else"
                |    "always"
                ;
opt_target:     /*empty*/
                |    target
                ;
opt_action      /*empty*/
                |    "{"action"}"
                ;
opt_recpt:      /*empty*/
                |    onreceipt"{"action"}"
                ;
event:          STRING;
condition:      STRING;
action:         STRING;
source:         STRING;
target:         STRING | "@" STRING;
```

The above illustrative grammar definition provides the framework for defining a specification for a particular application, e.g., an event driven system, in accordance with the principles of the invention. All items in the illustrative grammar definition which appear in double quotes are terminal symbols (keywords, literals, tokens). The capitalized word STRING represents an alphanumeric string, and NUMBER represents a sequence of one or more digits. Alternatives are separated by a vertical bar "|", i.e., pipe symbol, and each grammar rule is terminated by a semicolon.

In accordance with the preferred embodiment, the specification format consists of two parts: a declaration and a specification. The declaration part of the specification of the preferred embodiment, contains, inter alia, a listing of symbolic names for all events that will be used in the specification. For example, the following code fragment is an illustrative declaration in accordance with the preferred embodiment:

```
%c_template     "c.ctp" /*optional: a C code template */
%p_template     "p.ctp" /*optional: a SPIN model template */
%p_map          "p.map" /* optional: maps C code to SPIN */
%event Cranswer
%event Crbusy
%event Crconn
%event Crdigit
%state S_idle
%state S_pots
%state S_alloc
%state S_parked
%state S_busy
%%
```

In the above illustrative declaration, all words that begin with a percent "%" symbol are keywords. For example, "%c_template" defines the name of a file that contains a template for the final implementation of the code in C, i.e., the target implementation language of the preferred embodiment. Further, the "%p_map" statement gives the name of a file that can be used to define a relation between the C code from the implementation and the abstract representations of the code, i.e., mapping, used for verification with the model checker. In addition, the illustrative declaration above further contains a listing of symbolic names for all events, e.g., "%event Cranswer", that will be used in the specification, as well as, a list of state names for all of the control states, e.g., "%state S_idle", in the specification.

The core of the specification format, in accordance with the invention, is the specification of a set of transition rules for the event driven system wherein the state specification consists of a sequence of transition rules specified in the following notation:

state :event1 targetstate1 {code fragment1}
      | event2 targetstate2 {code fragment2}
      . . . etc.
      ;

For example, the following code fragment is an illustrative control state specification in accordance with the preferred embodiment:

```
S_idle : Cronhook S_idle
             {x→cwswit &= Swhook;}
       | Crflash
             {x→cwswit |= Swhook;}
       | Croffhook @S_idle_E3
             {x→cwswit |= Swhook;}
       | Iring @S_idle_E5
       ;
```

In the above illustrative control state specification, the transition rule begins with the name of the state, e.g., "S_idle", followed by a colon. After the colon, a series of possible transitions out of this state are listed. The individual transitions are separated from each other by a vertical bar "|". Each complete transition has three parts: the name of an event that triggers the response, the name of a new state that is reached after the response has been performed, i.e., "the next-state", and the response itself. The next-state part of the specification defines where control moves after the response has been completely processed, and contains the name of either a predefined control state or a so-called internal state. If two events have the same next-state and response, in accordance with further embodiments of the invention, an abbreviated notation can used such as:

```
| Crflash
+Crdis
+Croffhook S_idle
       {x→cwsit |= Swhook;}
```

Using the above noted abbreviated notation, the events Crflash, Crdis, and Croffhook will all generate the same response, i.e., the execution of the specified code fragment and a transition to the state "S_idle".

As will be appreciated, the event driven system is meant to stop execution at each control state and wait for the arrival of the next event. In contrast, the event driven system passes through internal states without waiting. In addition, state names in the next-state segment of a transition rule can be prefixed with the "@" symbol (it should be noted that this particular notation is not the same as that described previously with regard to identifying control states in accordance with the various aspects of the invention in "the Method and Apparatus For Developing Event Driven Software application") to indicate that processing of the next state should continue without waiting for a next event to arrive. In such a case, the last event remains available if an event is needed to determine the behavior of the system at a next state.

With reference to the internal states mentioned above, such events encode an internal, non-event related decision of the event driven system. In accordance with the preferred embodiment of the invention, the syntax in the specification for internal events is the same as for control states, except that instead of event names, general Boolean conditions in the target implementation language are used. For example, an illustrative internal state is defined as follows:

```
S_idle_E5:    {x→drv→trunk} @S_otrunk
                   {x→orig=ipc→orig;
                                  ipc→orig→term = x;
                                  emitcdr{x,CDRtransit,0};}
         | ! {x→drv→trunk} @S_idle_E6
         ;
```

The above illustrative internal state specifies that the value of a specific field (in this case hiding two levels inside a C data structure named "x") will decide whether control moves into state "S_otrunk" or state "S_idle_E6". In the first case, the piece of action code defined after the state will be executed. In the latter case, no code is executed.

In accordance with the preferred embodiment, if the name of an event or condition is "else" this indicates that a default response will be taken when none of the explicitly listed event names or Boolean conditions apply. For example, the above illustrative internal state code fragment can also be written as follows:

```
S_idle_E5:    {x→drv→trunk} @S_otrunk
                   {x→orig=ipc→orig;
                                  ipc→orig→term = x;
```

-continued

```
                                    emitcdr{x,CDRtransit,0};}
| else @S_idle_E6
;
```

In accordance with this alternative internal state code fragment, no code fragment is executed when the condition "{x→drv→trunk}" evaluates to "false" upon reaching this state. Instead, only a transition into state "S_idle_E6" will result.

Further, with regard to the specification of the event driven system, it is sometimes useful to define a common action fragment that must be executed immediately following the reception of an event in a control state. By definition, such a code fragment is to be executed before any of the transition rules are applied. In accordance with the preferred embodiment of the invention, the keyword "onreceipt" is employed to define such common action fragments. An illustrative example of this keyword's use is as follows:

```
S_orig : onreceipt
        {x→cwswitch&= ~Swconn;
              y=callroute(x→endpt→ctxt, x→lidb→number,&i);}
    | (y == nil) @S_orig_E54
    | else @S_orig_E55
    ;
```

In the above illustrative code fragment, the state is an internal state so it can always be referred to in a next-state segment with the "@" prefix. The "onreceipt" code is immediately executed when reaching this state on a transition, and the condition "(y==nil)" is evaluated. If the condition is "true", the system moves into another internal state named "S_orig_E54", and if "false", the system move into internal state "S_orig_E55" where processing continues without waiting for a new event.

Finally, with regard to the specification, it is sometimes useful to bypass condition checks altogether and specify an intermediate transition state that will lead unconditionally to a successor state. In accordance with the preferred embodiment of the invention, a condition that is always true is represented by the keyword "always" as is illustrated in the following example code fragment:

```
S_enabdial  : onreceipt
                    {x→ndigits=0;
                     x→drv→dtmf(x,1);
                     x→cwswit | Swconn;}
            |0 always S_dial
            ;
```

Our realization of the above-described formal specification in describing event driven systems for model checking purposes advantageously provides a specification format for describing the behavior of a event driven system.

To further illustrate the various aspects and advantages of the invention in testing event driven software, FIG. 10 shows intermediate state machine code 1000 (delineated by individual program code line numbers 1–124) derived, in accordance with the principles of the invention as discussed above, from the source code listing of the illustrative C source code program 500 of FIGS. 5 and 6. As discussed above, to effectively perform model checking on event driven code, an accurate assessment and identification of the control states, events, and actions must occur. Advantageously, intermediate state machine code 1000, in accordance with the principles of the invention, provides a clear delineation amongst control states, events and actions. More particularly, in accordance with the preferred embodiment, a translator is applied to C source code program 500 to directly generate intermediate state machine code 1000. The actual construction of the translator will be readily understood by those skilled in the computer programming art and need not be discussed further herein. However, by structuring C source code program 500 in accordance with the present invention, the automatic identification of the relevant control states, events, and actions is made possible. Thus, the advantages of the present invention as set forth herein are realized.

More particularly, a careful examination of intermediate state machine code 1000 show a clear delineation of events (see, e.g., code section 1010) and control states (see, e.g., code section 1020) of the declaration part of code 1000. Further, the clear interaction amongst and between such events, control states and the related actions is shown, in accordance with the invention, by the various state specifications (see, e.g., state specifications 1030 through 1050) within intermediate state machine code 1000. As discussed above with reference to the operations of FIG. 9, in accordance with the invention, intermediate state machine code 1000 is converted to the model checker input language for executing the testing of the subject program code. This conversion is facilitated by a translation map which is defined at the initial stage of the verification process. The mapping, inter alia, dictates a fixed translation of the particular statement into the target language of the model checker. Thus, instructions that appear in the map are systematically converted into the automaton model wherever such instructions appear in the original source code.

FIG. 11 shows an illustrative map 1100 for the event driven system defined by the illustrative C source code program 500. Map 1100 consists of program code 1110 (delineated by individual program code line numbers 1–47) which defines how the fixed translation of particular statements in the original source code is made into the target language of the model checker. In particular, program code 1110 is includes event definitions 1120 and code definitions 1130. For example, line 20 of program code 1110 maps every occurrence of the statement in the left hand column onto the abstraction given in the right hand column. In accordance with the invention, the application of map 1100 results in the derivation of model checker input language 1200 (delineated by individual program code line numbers 1–303) shown in FIGS. 12 and 13. Further, in accordance with the invention, a set of library functions is generated, illustratively shown as library functions 1400 in FIG. 14, for the model checker input language of FIGS. 12 and 13. As will be appreciated, library functions 1400 (delineated by individual program code line numbers 1–153) provide the necessary semantics for defining terms in model checker input language 1200. In accordance with the preferred embodiment, model checker input language 1200 is directed to and useful with the SPIN model checker tool.

Significantly, one important feature of using maps, in accordance with the invention, is the capability provided to the user in defining precisely the appropriate level of detail at which the checking process will be applied, in a source independent manner. The map can contain "true" or "skip" as the translation (i.e., right hand column of program code 1110 described above) of any statement which indicates that this detail is abstracted away. Therefore, the map acts as a "filter" to filter out extraneous detail, in addition to, acting as a converter from the target programming language, e.g., C, to the verification model. The map also serves as a complete formalization of the linkage between source code and the verification model.

As described above, in accordance with the preferred embodiment of the invention, the verification of the properties of the event driven system is made subject to an environmental model during the testing and checking (see, FIG. 9, block 975) of the event driven software by the verification system. The environmental model formalizes particular assumptions, made by the user, about the environment in which the event driven program code is to be executed. For example, in the case of the illustrative telecommunications call processing application described herein, the environmental model might include formalizations directed to subscriber behavior, hardware responses, and communications network performance. In particular, FIG. 15 shows an illustrative environmental model 1500 (delineated by individual program code line numbers 1–80) for the telecommunications processing application described in FIGS. 5 and 6. For example, code fragment 1510 of environmental model 1500 describes a formalization, i.e. a template, for a telecommunications device useful in the illustrative telecommunications application. In accordance with the preferred embodiment, the model checker, i.e., SPIN, will use model checker input language 1200 in conjunction with environmental model 1500 to determine whether the event driven system conforms with the user's desired execution properties and behaviors.

Advantageously, the separate definition of the map and environmental model, in accordance with the invention, ensure that little, if anything, in the verification infrastructure needs to be updated when routine changes are made in the original source code. That is, unless new basic types of statements are introduced in the source code, the verification process can be repeated without user intervention and the source code may be checked for continued compliance against a large library of essential correctness properties. Further, in accordance with the invention, a precise automaton model representative of the event driven code under test is automatically generated directly from the source code and verified with a logic model checker, e.g., SPIN.

Figure 16:
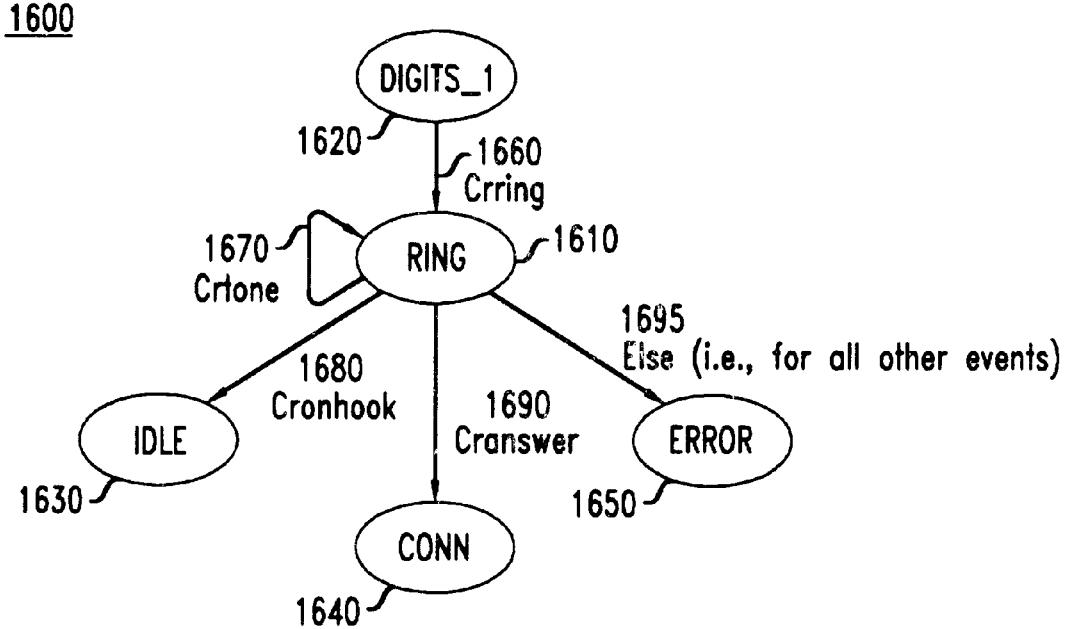
FIG. 16 shows an illustrative automaton model for a particular control state defined by the telecommunications processing application of FIGS. 5 and 6.
Figure 17:
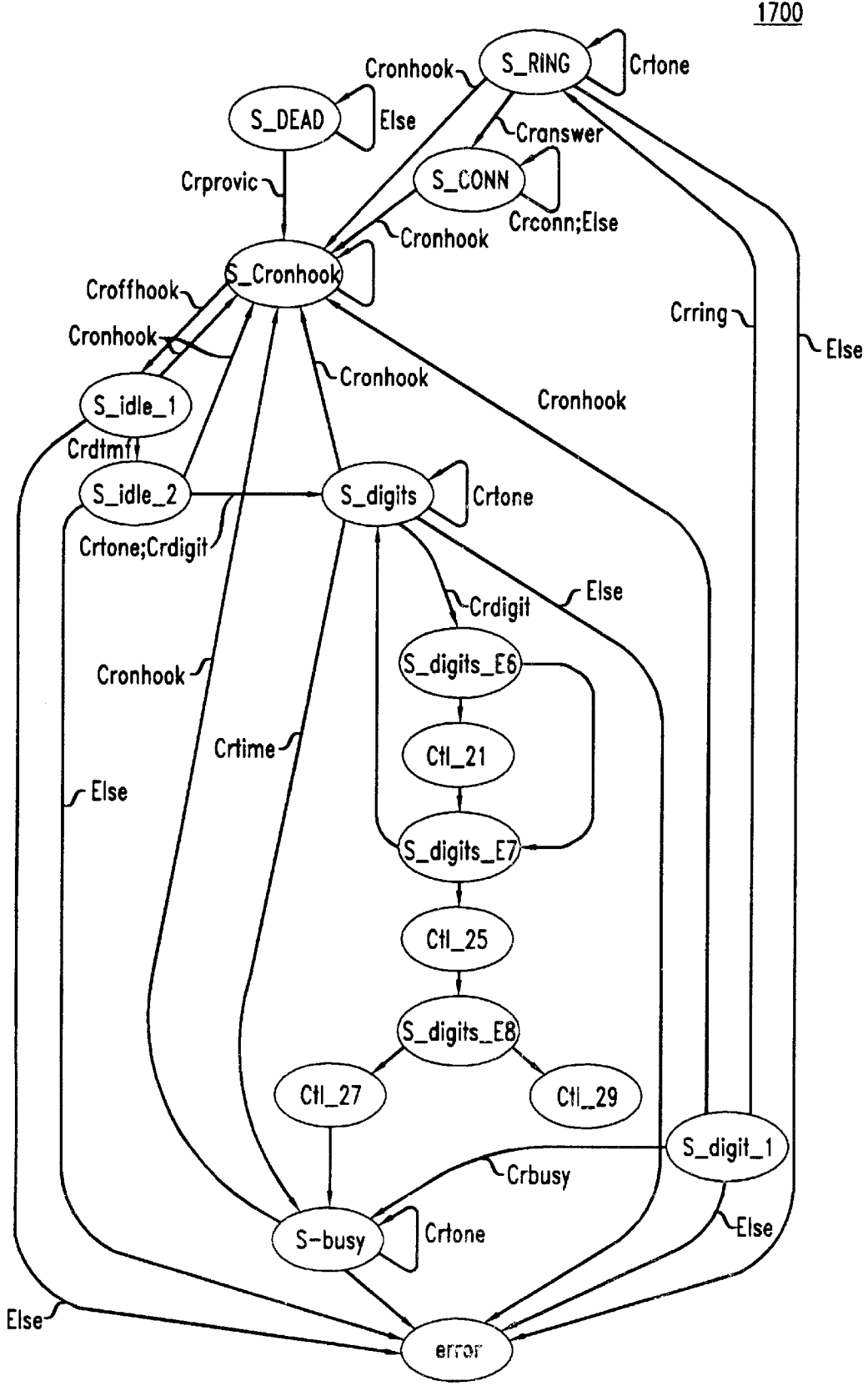
FIG. 17 shows an illustrative full automaton model of the complete telecommunications processing application described in FIGS. 5 and 6.

For example, FIG. 16 shows an illustrative automaton model 1600 for a particular control state defined by the telecommunications processing application described in FIGS. 5 and 6. More particularly, the control state depicted in FIG. 16 is the so-called "ring" control state defined in source code program 500 as control state 545 (see, FIGS. 5 and 6). The "@ring" program statement in line 183 of source code program 500 begins the clear delineation of this particular control state from a source program viewpoint. In accordance with the testing and checking aspects of the invention, as described above, from this control state a precise automaton, e.g., automaton model 1600, is extracted. Automaton model 1600 clearly shows the transitions in and out of the "ring" control state 1610 and amongst other control states of the application, i.e., "digits_1" control state 1620, "idle" control state 1630, "conn" control state 1640, and "error" control state 1650. Automaton model 1600 also clearly illustrates the various events, i.e., event 1660 through event 1695, occurring in the illustrative application. Further, full automaton model 1700, shown in FIG. 17, is an illustrative full automaton model of the complete telecommunications processing application described in FIGS. 5 and 6, and automatically generated in accordance with the invention.

The above-described embodiments of the invention employ a C source program written (see, e.g., FIGS. 5 and 6) in accordance with the principles of the "the Method and Apparatus For Developing Event Driven Software application", and tested in accordance with the principles of the present invention as described above. We have further realized that certain types of users, e.g. verification system programmers or software testing engineers, may wish to begin their system design process by defining the event driven in accordance with the specification format described above. For example, such users may employ the specification format set forth herein to directly code the subject event driven system. Thus, in accordance with further embodiments of the invention, the specification is converted into a target programming language, e.g. C., for direct compilation and execution. In accordance with such further embodiments of the invention, a template is employed to facilitate such a conversion. The following is an illustrative C code template for use in converting this such state machine code to standard C for compilation and execution:

```
void
state(Line *x, Ipc *ipc)
{       Line *y;
        int op, i, c, os, time;
        goto start;
        /*** template: ***/
        @C
out:
        if (x == nil)
return;
        if (time != 0)
        {
        x->time=rtms()+time;
        addtimer(x);
        }
        return; /* exit-point */
start:
        op=ipc->type; os=x->state; time=0; switch (os)
        {
        @@
        }
        os=0;
error:
        y=x->term; x->term=nil; goto Aerror;
}
```

The above-described C code template provides the framework for a complete conversion of the state machine specification to C. As will be appreciated, the illustrative C code template can be executed by the model checker tool itself or on a separate machine. The template includes type definitions for the arguments that are passed to a routine called "state" that is used as the core of the conversion implementation. The routine must be called whenever an event occurs that relates to the subject event driven system. The template code further contains a place-holder "@C" for the state machine that is generated from the transition rules specified in accordance with the invention. The actual program code necessary for the generation of the state machine will be readily understood by those skilled in the art and need not be further detailed herein. At each call, the "start" routine executes and retrieves an event type and parameter value from the data structure that is used by the environment to store detailed information about the current event. The current state of the process is retrieved from the data structure in the first argument to the routine, and a so-called "C switch" is performed on this state value to establish the proper position in the transition rules. The short-hand symbol "@@" of the template is expanded by the tool into a full list of names of all control states, with matching jumps to the places in the generated, i.e., converted, C code where the code fragments for the transition rules of each state are placed. Advantageously, in accordance with these further embodiments of the invention, the specification is converted into a target programming language, e.g., C, for direct compilation and execution.

Figure 18:
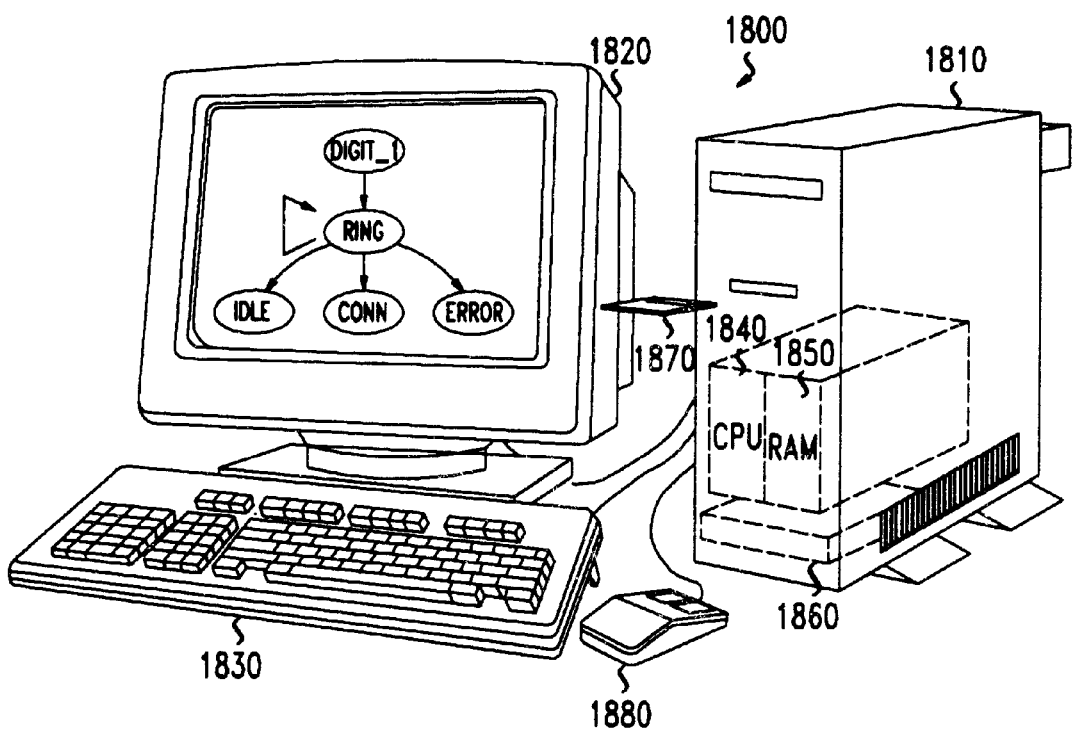
FIG. 18 shows an illustrative computer system 1800 useful in executing event driven software code which is specified and written in accordance with the present invention.

For example, FIG. 18 shows an illustrative computer system 1800 useful in executing and testing event driven software code in accordance with the present invention. In particular, computer system 1800 includes conventional personal computer 1810 which is connected to display 1820 and keyboard 1830. As will be appreciated, information produced by personal computer 1810, e.g., during execution of particular event driven software code, may be displayed on display 1820 for access by a user of computer system 1800. The user, as a result of viewing display 1820, interacts with and controls personal computer 1810, in a conventional manner, using keyboard 1830. Further, mouse 1880, or other well-known pointing devices, may allow the user to provide additional inputs to personal computer 1810. Illustrative computer system 1800 further includes processor 1840 which, illustratively, executes and tests event driven application software code in accordance with the present invention. For example, such event driven application software code may be loaded into personal computer 1810 via conventional diskette 1870 and thereafter stored in internal disk memory 1860. Further, execution and testing of the code may require access and use of random access memory 1850 ("RAM") in a conventional manner. Thus, the user of computer system 1800 can execute and test software, in accordance with the present invention, to provide a wide variety of applications, e.g., an event driven system. Further, as will be appreciated, computer system 1800 may also be connected, in a conventional manner, to other computer systems or devices for execution and testing of the particular application programs.

For example, computer system 1800 can be used to execute and test software, in accordance with the present invention, resulting in error trace 1900 as shown in FIG. 19. Error trace 1900 consists of program code 1910 (delineated by individual program code line numbers 1–47) and is an illustrative error trace, generated in accordance with the principles of the invention, for the telecommunications processing application described in FIGS. 5 and 6. More particularly, the illustrative error trace 1900 shows how the checking process produces a scenario which directly identifies the presence of errors in the original source code of the event driven system. Further, error trace 1900 through program code 1910 identifies such errors in terms of programming level statements, e.g., C-level statements, that may be executed to reproduce the error. In the illustrative error trace 1900, the trace demonstrates in a direct sequence of C-program code statement (see, FIG. 9, program code 1920) executions that leads the event driven system into the illustrate state "@busy" with "Crdigit" being the first event to be processed. As can be seen and appreciated from error trace 1900, in conjunction with, C source program code 500 (in particular, control state 555 at line 223), there is no provision in the program code, i.e., a coding error, to anticipate the possible occurrence of this event. Advantageously, in accordance with the invention, a user can interpret error trace 1900 solely in terms of C-level execution statements without any specialized knowledge of the model itself or significant parts of the intermediate representations that are used in the checking process itself.

The foregoing merely illustrates the principles of the present invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the Applicant(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flowcharts, flow diagrams, state transition diagrams, pseudocode, program code, and the like represent various processes which may be substantially represented in computer readable medium and so executed by a computer, machine, or processor, whether or not such computer, machine, or processor, is explicitly shown.

Further, in the claims hereof any element expressed as a means for performing a specified function is intended to encompass any way of performing that function, including, for example, a) a combination of circuit elements which performs that function; or b) software in any form (including, therefore, firmware, object code, microcode or the like) combined with appropriate circuitry for executing that software to perform the function. The invention defined by such claims resides in the fact that the functionalities provided by the various recited means are combined and brought together in the manner which the claims call for. Applicants thus regard any means which can provide those functionalities as equivalent as those shown herein.

We claim:

1. A software testing method comprising:

providing a source program of the software, the source program including a plurality of instructions which contain a first source code segment for causing a computer to execute a event driven system; the first source code segment including a first plurality of instructions defining a plurality of control states, the plurality of control states being associated with the event driven system, a second plurality of instructions defining a plurality of events of the event driven system, and a third plurality of instructions defining a plurality of actions of the event driven system, each control state of the plurality of control states having an individual identifier within the first plurality of instructions of the first source code segment, the individual identifier being a programming symbol which is common to all the identified control states, and a second source code segment containing at least one plurality of instructions defining a sequential control of the computer executing the event driven system;

parsing the source program to identify the plurality of control states and converting the source program to a state machine format;

applying a translation map to the plurality of instructions of the source program;

converting the state machine format of the source program to a verification program;

applying an environmental model to the verification program; and testing the software in a verification tool using the verification program.

2. The software testing method of claim 1, wherein the translation map includes a plurality of mapping instructions.

3. The software testing method of claim 2, wherein the applying the translation map operation includes:

comparing the plurality of mapping instructions to the plurality of instructions of the source program to detect a match; and converting particular ones of the mapping instructions which match particular ones of the instructions of the source program to an input language of a model checker.

4. The software testing method of claim 2, wherein the environmental model includes a plurality operational attributes of the event driven system.

5. The software testing method of claim 1, wherein the verification tool is a model checker tool.

6. The software testing method of claim 5, wherein the model checker tool is a SPIN model checker tool.

7. A software testing apparatus comprising:

means for providing a source program of the software, the source program containing a first source code segment for causing a computer to execute an event driven system, the first source code segment including a first plurality of instructions defining a plurality of control states, the plurality of control states being associated with the event driven system, a second plurality of instructions defining a plurality of events of the event driven system, and a third plurality of instructions defining a plurality of actions of the event driven system, each control state of the plurality of control states having an individual identifier within the first plurality of instructions of the first source code segment, the individual identifier being a programming symbol which is common to all the identified control states, and a second source code segment containing at least one plurality of instructions defining a sequential control of the computer executing the event driven system;

means for parsing the source program to identify the plurality of control states and means for converting the source program to a state machine format;

means for applying a translation map to the plurality of instructions of the source program;

means for converting the state machine format of the source program to a model checker program in an input language of a model checker;

means for applying an environmental model to the model checker program;

means for testing the software in the model checker using the model checker program; and means for displaying a result of the testing of the software.

8. The software testing apparatus of claim 7, wherein the translation map includes a plurality of mapping instructions.

9. The software testing apparatus of claim 8, wherein the means for applying the translation map includes:

means for comparing the plurality of mapping instructions to the plurality of instructions of the source program to detect a match; and means for converting particular ones of the mapping instructions which match particular ones of the instructions of the source program to the input language of the model checker.

10. The software testing apparatus of claim 9, wherein the environmental model includes a plurality operational attributes of the event driven system.

11. A machine-readable medium having stored thereon a plurality of instructions, the plurality of instructions including instructions that, when executed by a machine, cause the machine to perform a method of:

testing event driven software by parsing a source program of the software to identify a plurality of control states and converting the source program to a state machine format, the source program containing a first source code segment for causing a computer to execute the event driven system, the first source code segment including a first plurality of instructions defining a plurality of control states, the plurality of control states being associated with the event driven system, a second plurality of instructions defining a plurality of events of the event driven system, and a third plurality of instructions defining a plurality of actions of the event driven system, each control state of the plurality of control states having an individual identifier within the first plurality of instructions of the first source code segment, the individual identifier being a programming symbol which is common to all the identified control states, and a second source code segment containing at least one plurality of instructions defining a sequential control of the computer executing the event driven system;

applying a translation map to the source program;

converting the state machine format of the source program to a verification program; and applying an environmental model to the verification program, and testing the software by applying the verification program to a verification system.

12. The machine-readable medium of claim 11, wherein the verification system applies the verification program to a SPIN model checker.

13. The machine-readable medium of claim 12, wherein the event driven system is a telecommunications service application, the telecommunications service application having at least one event associated with extending a telephone call through a communications network.

14. The machine-readable medium of claim 13, wherein the state machine format is converted using a specification defined by a user.

15. A software testing system comprising:

a computer having at least one memory;

means for receiving a series of programming language statements in the memory, the series of programming language statements comprising a first source code segment and a second source code segment for causing the computer to execute an event driven system, the first source code segment including a first plurality of instructions defining a plurality of control states of the event driven system, a second plurality of instructions defining a plurality of events of the event driven system, and a third plurality of instructions defining a plurality of actions of the event driven system, each control state of the plurality of control states having an individual identifier within the first plurality of instructions of the first source code segment, the individual identifier being a programming symbol which is common to all the identified control states, the second source code segment containing at least one plurality of instructions defining a sequential control of the computer in executing the event driven system;

means for parsing the first source code segment to identify the plurality of control states and means for converting the first source code segment and the second source code segment to a state machine format;

means for applying a translation map to the first source code segment and the second source code segment;

means for converting the state machine format to a model checker program in an input language of a model checker;

means for applying an environmental model to the model checker program;

means for testing the software in the model checker using the model checker program; and means for displaying a result of the testing of the software.

16. The software testing system of claim 15, further comprising:

means for compiling the first source code segment and the second source code segment into an object program in the memory; and means for executing the object program in the computer to provide the event driven system.

17. The software testing system of claim 16, wherein the means for testing uses at least one set of properties defined by a user associated with the execution of the event driven system.

18. The software testing system of claim 17, wherein the translation map is specified by the user.

19. The software testing system of claim 18, wherein the translation map, the environmental model, and the series of programming statements are each written in a C programming language.

20. The software testing system of claim 16, wherein the model checker is a SPIN model checker.

21. The software testing system of claim 20, wherein the state machine format is converted using a specification defined by a user.

22. The software testing system of claim 20, wherein the displayed result includes at least one full automaton representation of the event driven system.

23. The software testing system of claim 15, wherein the event driven system is a telecommunications service application, the telecommunications service application having at least one event associated with extending a telephone call through a communications network.

* * * * *